(12) United States Patent
Hopwood et al.

(10) Patent No.: US 6,223,343 B1
(45) Date of Patent: Apr. 24, 2001

(54) COMPUTER SYSTEM AND METHOD TO TRACK AND CONTROL ELEMENT CHANGES THROUGHOUT APPLICATION DEVELOPMENT

(75) Inventors: Rene S. Hopwood, Goodfield; Bradley S. Sipes; Thomas P. Wayne, both of Bloomington; John E. Quarton, Normal; Stewart M. Milus, Peoria, all of IL (US)

(73) Assignee: State Farm Mutual Automobile Insurance Co., Bloomington, IL (US)

( * ) Notice: Subject to any disclaimer, the term of this patent is extended or adjusted under 35 U.S.C. 154(b) by 0 days.

(21) Appl. No.: 09/054,455

(22) Filed: Apr. 3, 1998

Related U.S. Application Data

(60) Provisional application No. 60/042,649, filed on Apr. 4, 1997.

(51) Int. Cl.[7] ....................................... G06F 9/445
(52) U.S. Cl. ........................ 717/11; 717/11; 707/203
(58) Field of Search ............................. 395/703, 704; 707/203, 201; 717/3, 11

(56) References Cited

U.S. PATENT DOCUMENTS

| | | | |
|---|---|---|---|
| 4,558,413 | * 12/1985 | Schmidt et al. ................. | 707/203 |
| 4,864,569 | * 9/1989 | DeLucia et al. ................. | 714/38 |
| 5,410,703 | * 4/1995 | Nilsson et al. ................. | 717/11 |
| 5,421,017 | * 5/1995 | Scholz et al. ................. | 395/712 |
| 5,515,524 | * 5/1996 | Lynch et al. ................. | 395/500.34 |
| 5,524,246 | * 6/1996 | Hurley et al. ................. | 713/1 |
| 5,787,444 | * 7/1998 | Gerken et al. ................. | 707/203 |
| 5,903,897 | * 5/1999 | Carrier, III et al. ............. | 707/203 |
| 5,950,209 | * 9/1999 | Carrier, III et al. ............. | 707/203 |
| 5,960,196 | * 9/1999 | Carrier, III et al. ............. | 717/1 |
| 5,970,503 | * 10/1999 | Eisenberg ................. | 707/203 |
| 5,974,428 | * 8/2000 | Gerard et al. ................. | 707/203 |
| 6,101,327 | * 8/2000 | Holte Rost et al. ............. | 717/11 |
| 6,113,652 | * 9/2000 | Lysik et al. ................. | 717/11 |

OTHER PUBLICATIONS

Walpole et al, "A unified model for consistent distributed software development environments", ACM pp 183–190, 1988.*

Ornburn et al, "Building, modifying and using component genertaors", IEEE pp 391–402, 1993.*

Mehandjiev, "Viewpoints based software for managemnt problem solving interventions", SIGSOFT ACM pp 275–279, 1988.*

Hall et al, "A cooperative approach to support software deployment using the software dock", ICSE, ACM pp 174–183, 1999.*

Wein et al, "Visual support for version management", ACM pp 12171223, 1992.*

Heidenreich et al, "A new approach to consistency control in software engineering", Proc. of ICSE, IEEE, pp 289–297, 1996.*

Zeller, "A unified version model for configuration management", SIGSOFT ACM pp 151–160, 1995.*

* cited by examiner

*Primary Examiner*—Paul R. Lintz
*Assistant Examiner*—Anil Khatri
(74) *Attorney, Agent, or Firm*—Irah H. Donner; Hale and Dorr LLP

(57) ABSTRACT

A revision management system includes an inventory group manager (IGM), a work group manager (WGM), and a version manager (VM). The IGM generates and manages one or more lists for each of one or more elements logically related to each other as one or more inventory groups. The IGM also maintains and manages the lists of the elements in the inventory group and provides new elements to be added to the inventory group. The WGM selects the elements relating to a project that require modification. and selects elements from the inventory groups to form a project work group. The VM tracks and manages the modifications to the elements in the project work group, and generates reports with respect to the modifications responsive to user selectable criteria.

65 Claims, 17 Drawing Sheets

FIG. 21
ICON KEY:
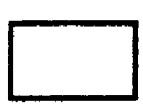 WORK GROUP FOLDER
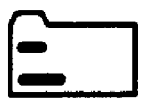 INVENTORY GROUP FOLDER
 FILES LOCKED FOLDER (RED)
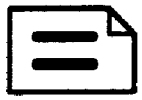 ELEMENT
 DENOTES THE BEGINNING OF A BRANCH
 LOCKED REVISION
 VERSION LABEL

COMPUTER SYSTEM AND METHOD TO TRACK AND CONTROL ELEMENT CHANGES THROUGHOUT APPLICATION DEVELOPMENT

RELATED APPLICATIONS

The application claims priority to U.S. Provisional patent application No. 60/042,649 filed Apr. 4, 1997, which is herein incorporated by reference.

TECHNICAL FIELD

This invention relates to a computer system and method to track and control element changes throughout application development, and, more specifically, to a computer system and method to track and control element changes throughout application development by forming logical relationships between elements, and by forming work groups responsive to the logical relationships.

BACKGROUND ART

FIG. 1 is a basic block diagram of the overall system architecture in a standard computer system that requires coordination between updating of elements that may be changed by various components in the system. In FIG. 1, main frame 2 includes the overall programs and processes for implementing various programs, such as insurance premium programs, billing procedure programs, correspondence programs, address information programs, and the like. Main frame 2 is accessible via developer work station 4 for initiating changes to the main frame 2 programs stored therein.

Corporate workstation 6 utilizes some of the programs stored in main frame 2 for corporate purposes. Claim litigation office 7 accesses certain programs in main frame 2 via corporate workstation 6. The litigation office 7 may access all programs or a subset of programs via corporate workstation, depending on the need of the individual in claim litigation office 7. One or more insurance support centers (ISC) 8 receive information from, and transmit information to, main frame 2 for insurance requirements. For example, main frame 2 will transmit, on the instruction of a developer, recent program changes that affect the ISC 8. On the other hand, ISC 8 may transmit premium or customer information to main frame 2 to update customer records, outstanding obligations or even process claims. ISC 8 may be used to coordinate among a plurality of regional offices as described below, that perform similar functions as ISC 8. On the other hand, ISC 8 may be used to coordinate among the regional offices, and might not contain any substantive programs that relate to customer services.

Main frame 2 is also optionally connected directly to a regional office 12 for direct communications, in a similar manner as connected to ISC 8. Main frame 2 is also optionally connected to a public network, such as a standard public switched telephone network (PSTN) 10, for connection to regional office 14 and regional office 16 via ISC 8. Regional office 12 may include one or more work stations which allocate work based on individual, geographic area, or other criteria.

Regional office 12 is optionally connected to, for example, agent office 18 where agents are able to directly utilize the regional office 12 computer system. Regional office 12 may also be optionally connected to claim office 20 for processing customer claims/issues. Further, claim office 20 may, in turn, be connected to a second tier claim office 22 to provide a mechanism for claim office 22 to access the regional office computer system 12.

FIG. 2 is an illustration of the basic components of main frame 2. In FIG. 2, main frame 2 includes three basic components: support platform 26, production platform 28, and developer platform 30. Support platform 26 is used, for example, to load new programs, operating systems and the like, to evaluate its use for the entire computer system. Developer platform 30 includes development tools for creating and testing new development programs. Production platform 28 then distributes the developed and tested programs/elements for distribution to the necessary components of the system.

Developer platform 30 includes build issuance (BLDISS) component that receives element changes from a developer work station or host developer analyst. Build issuance 32 transmits the changes or modifications to post issuance (POSTISS) component 36 for distribution to down stream system components via corporate implementation system (CIS) 38 to the corporate system, generalized work station implementation system (GWIS) 40 to the developer work stations, and regional implementation system (RIS) 42 to the regional or ISC systems. Each of these components, as well as some additional components utilized in the prior art system, are described in detail below.

CMU: abbreviation for Change Management Utility. CMU is an interface to a vendor product called "PVCS" (Polytron Version Control System) that provides a method to manage changes to elements on the workstation.

BLDISS: abbreviation for Build Issuance. BLDISS is a dialog process used to enter the initial bookkeeping information for an element's issuance. It creates an Issuance Control Member (ICM) which stores information related to the issuance and implementation of an element. HP BLDISS performs BLDISS functions listed above for elements managed on an HP (Hewlett-Packard) system.

POSTISS: abbreviation for Post-Issuance. POSTISS is a system that collects and bundles elements for transmission to their production execution destination prior to their effective date.

RIS: abbreviation for Regional Implementation System. RIS is a dialog process which resides in the regional offices. Its primary functions include queuing transmitted elements to the appropriate staging libraries, verifying that elements are eligible for installation into production, and implementing those elements to the correct production libraries when requested. RIS requires manual intervention by an Issuance Technician to initiate any of its processes. A similar implementation system exists for HP to distribute and implement HP elements on the destined HP machines in the regional data centers.

CIS: abbreviation for Corporate Issuance System. CIS is an automated system for staging and implementing elements into the Corporate Data Center (CDC) production environment. A similar system exists for the HP Corporate Issuance System to distribute and implement HP elements on the destined HP machines in CDC.

GWIS: abbreviation for Generalized Workstation Implementation System. GWIS is a facility used to distribute and implement workstation elements. The vendor package AM:PM is used to communicate between the IBM host and IBM-attached workstations.

PRJINFO: a facility that allows customers to perform various change management functions on groups of elements within an Issuance Name. Among these functions are the ability to build and mark ready ICMs, cross-reference elements both in development and production (PRODXREF), move elements to the system testing environment (ANTSISS), sign-out elements to an issuance name, and associate elements to a user-id.

Cross-reference tools (CXREF): CXREF is a production element cross-reference utility on IBM. Production Cross Reference tools (PRODXREF) is the utility on HP which tracks both development and production cross-reference information.

Number Signout Facility (NUMBER): NUMBER is an IBM mainframe tool which allows application analysts and librarians to "sign out" element numbers needed for application development.

PI.P: abbreviation for Production Interface—Panvalet. PI.P is an interface to the production Panvalet libraries to retrieve, browse, or print element source.

PCF: abbreviation for Project Communication Facility. PCF allows Corporate analysts to access Implementation Memos (IM), Coordination Control Members (CCM), and Special Communications (SC) built in BLDISS and sent to any data center.

The following described one or more of the above components in greater detail. The major functions and their descriptions are listed below. Before a component can be implemented, it must be processed through the issuance flow.

BLDISS is an interactive facility used to initiate the issuance process. Information is entered by the issuing analyst and stored into an ICM and placed on an ICM PANVALET. The BLDISS facility is an application which contains four functions:

A. Build and edit allows the entering of information which is needed to initiate an issuance. It contains a build and edict mode and will allow for a WEEKLY (cutoff Monday for implementation the following Monday), DAILY (requires 2 days lead time for implementation), EMERGENCY (to be implemented A.S.A.P.), DUMMY (secures components and produces analyst and shopwide documentation) and DUPLICATE (for advance pilot testing). The facility supports four types of issuances. They are as follows:

Type 1—Program
Type 2—Message
Type 3—Dynamic Table
Type 4—Security Profile

Of the four types, Programs require the use of a program linkdeck which can contain Audits, Images, Segments, Tables, and the Program source. The other three require only the source member.

B. Status change allows an item to be changed from "NOT READY FOR ISSUANCE" to "READY FOR ISSUANCE".

C. Display will allow browsing or printing of formatted issuance information.

D. Directory List will allow for a listing of components that have issuance information built for them.

The issuance processor is a background job that will perform the following tasks to transfer a program (e.g., a ADF program, and the like) and all of its components from a test to production environment. The issuance processor is a batch job submitted from BLDISS when a component is marked "ready for issuance". The purpose of this job is to generate the proper load code and store the load and source into a secured production library. Documentation and audit trails are also produced at this time.

A. Update issuance status dataset to indicate the issuance processor is running.

B. Retrieve the issuance control member from the production PANVALET library.

C. Retrieve the component from the appropriate area PANVALET library.

D. For the different components the following things happen:

AUDIT—The audit is retrieved from the area PANVALET to a dataset. It is then compiled, loaded and retrieved to create a static load module.

STATIC TABLE—The table is retrieved from the area PANVALET to a dataset. It is then loaded and retrieved to create a static load module.

IMAGE—The image is retrieved from the area or production PANVALET to a dataset and aliased for generic reference within the program. It is then used as input to program generator.

SEGMENT—The segment is retrieved from the area or production PANVALET to a dataset and aliased for generic reference within the program. It is then used as input to program generator.

PROGRAM—The program is retrieved from the area PANVALET to a dataset and then used as input to program generator.

MESSAGE—The message is retrieved from the area PANVALET to a dataset. It is then loaded.

DYNAMIC TABLE—The table is retrieved from the area PANVALET to a dataset. It is then loaded.

SECURITY PROFILE—The profile is retrieved from the area PANVALET to a dataset. It is then loaded. (Components are implemented to the appropriate destination load library, or separately. The source is sent to the appropriate destination and used as input to the database update job.)

E. If step D above completes successfully, transfer the appropriate source members to production and inactivate them from the area PANVALET.

F. Produce analyst audit trail containing a description of the data movement accomplished by the processor, the issuance control sheet, and the issuance data dump.

G. Store all of the output needed for the production of microfiche to the staging documentation library.

H. Update the user code of the issuance control member and the issuance status dataset to indicate ready for documentation.

A facility is also provided used by issuance administration to select components to be sent to the proper destination for implementation. The ICMs and load are "customized" (copied into a dataset with other components going to that same destination). The regional components are transmitted (using teleprocessing lines) while the corporate components are copied into datasets.

In addition, to BLDISS and POSTISS, a Documentation Processor is provided that is a nightly job that performs the following functions:

A. Gather issuance unit documentation for all issuance processors that processed that day.

B. Gather information for the following analyst microfiche:

1. Component—Individual fiche for each audit, table, message or profile issued and the corresponding sysprint from the gen or load.

2. Linkdeck—A fiche containing the issuance control sheet, data dump, audit trail along with the linkdeck and a source only listing of each component in the linkdeck whether it was issued or not.

C. Generate data to update the shopwide cross-reference dataset.

D. Update the user code of the issuance control member and the issuance status dataset to indicate issuance is complete.

Implementation of components is controlled through the use of Issuance Control Members (ICMs). Each component that is staged for implementation is accompanied by a corresponding ICM. The ICMs are stored on a PANVALET library and contain all of the information necessary to implement a component at the proper time in the proper place. ICMs are built by issuing analysis during an interactive issuance session called BLDISS. Any component that has been added to the BLDISS system will have ICMs.

The PANVALET user code and date field in the comment controls the automatic selection of components for the staging and implementation processing. ICMs that are staged for emergency processing have a different user code than non-emergencies. The functional or system destination is contained in the ICM. At implementation time, a code in the ICM determines which functional destinations the component is implemented to. The exact complex, system, and library to implement to is controlled by referencing a target library control dataset.

FIGS. 3–4 are flowcharts of the basic flow or process of updating element changes in the prior art system architecture. In FIGS. 3–4, PI.P stores most of the elements that analysts use for development purposes. PI.P stores various programs, modules, components, and various other types of elements. Analysts utilize PI.P to browse, print, retrieve, and the like, elements stored therein in step S2. Analysts are not required to identify the specific library storing the element.

Analysts then retrieve the elements, alter or change the element, and test the changed element in step S4. Once the analyst is satisfied with the changed element, the limited number of modified elements are stored on an area panvalet in step S6. Issuance information about the changed element is provided to a librarian on a sheet of paper in step S8. The librarian creates the ICM indicative of the changed element using BLDISS in step S10, and further all the issuance information associated with the changed element. The basic information entered by the librarian includes what element needs to be issued, who is issuing the element, when does the element need to be issued, and where does the changed element need to go for update purposes and why.

The analyst generally has the responsibility to do the actual software development, and the librarian is a clerical-type person that enters the specific element change information in the appropriate system, e.g., BLDISS. Thus, the analyst is the person who alters the element, and the librarian is the person who stores the data entry. The librarian uses BLDISS in step S10 to enter all the who, what, where and why information about the changed element. Once testing is completed, the element is stored on the area panvalet and the librarian creates the ICM, the librarian marks the ICM ready using BLDISS in step S12. The element source code will then be put into production via invocation of POSTISS in step S16. POSTISS creates executables for the source code, and distributes the executables as required in step S18.

Note that the source and the executable versions of the changed element can be one in the same, depending on the element type. Several times throughout the day and in the evening POSTISS is invoked to process elements including programs that have successfully gone through the issuance processor. POSTISS picks up the program load that is ready to be transmitted, and bundles it according to destination and transmits the bundles over the teleprocessing lines. For example, if program P-1,2,3,4 is to be distributed to all 28 regions, POSTISS puts together 28 bundles and send that one program across to 28 different destinations.

After the element is distributed by POSTISS, the element is moved into production and used to change the elements requiring updating in step S20. There are three separate modules which are supporting three separate entities. RIS supports distribution for the regional office or Insurance Support Center, CIS supports distribution for the corporate office, and GWIS supports distribution for the developer workstations.

If it is determined in step S22 that the element to be changed is for the regional office or ISC, the changed element is transmitted to the regional GWIS system in step S24. The PC technician uses the work station implementation system GWIS in step S26 to access a file to schedule the element change to the work stations and/or network servers.

FIG. 5 is a flow chart of the processes utilized by a work station developer. In FIG. 5, the work station developer initiates a directory level request with all elements in executable form to be changed or modified in step S28. A workstation developer who wants to issue a workstation component or element can also issue an element at the directory level in step S30. The developer accesses the BLDISS system as described above and indicates the directories where the executable elements are being stored, and which directories the elements are being updated for implementation. Thus, the work station developer is able to group together one or more elements to be downloaded into the destination systems. The developer indicates a directory on a workstation from which an element is to be issued.

Pre-install and post-install commands may optionally be specified to assist POSTISS in moving the designated elements into production. The data issuance information is uploaded to the host using generally one file, along with the pre-install or post-install information in step S32. The administrator workstation accesses the files, schedules the element changes for the workstation or groups of workstations as described above.

The following is a specific example of the use of updating elements in the existing computer system when the elements are, for example, dataset documents via the Automated Document Issuance System. The Automated Document Issuance System consists of two interactive systems. The first system is the Document Build Facility, BLDDOC, and the second is the Documentation Automated Security and Issuance System under BLDISS. Dataset document are created in BLDDOC and are issued through BLDISS. The interactive systems have been developed to provide:

1. A method to build, browse, and obtain a hardcopy of a dataset document interactively.

2. A method to issue and secure a dataset document.

3. A method to help enforce dataset documentation standards.

4. To create an audit trail of a dataset document issuance.

The following describes the procedures for building a dataset document through BLDDOC. There are three categories of dataset documentation, HP files, IBM datasets, and IBM VSAM datasets. Each type of document has a slightly different interactive session to building the document. The name of dataset documents consists of two parts. The first part is the filing key which can be up to 15 characters long. The second part is the version. This takes the form 'ANN' where 'A' represents an alphabetic character and 'N' represents numeric characters. The version of a production document must be incremented when it is revised and reissued.

The data item to be edited is selected by typing an 'S' in the selection field of the edit item table and hitting the 'ENTER' key. A prompt is generated to enter data through one or more panels. In the majority of the panels the 'ENTER' key is used to save the data entered. If the 'END' (PF15) key is used, any new or changed data will not be saved. The exceptions to this are free form edit items (i.e., data entered through SPF edit) and panels which use a DMS table for input (e.g., Job References). The 'END' key is used to store data for these exceptions.

A new document may be built using an existing document as a model provided the type of the model matches the type of the document to be built (e.g., an IBM VSAM document cannot be built using an HP document as a model). All dataset types have required information that must be entered before a document can be considered valid. Unlike BLDISS, BLDDOC does not force all of the required data to be entered in one edit session. The document is saved and the edit session ended without entering all of the required data. When the document is saved, it is stored in a 'COMPLETE' or 'NOT COMPLETE' status. A document is considered 'COMPLETE' if all the required data items have been entered. It is considered 'NOT COMPLETE' if at least one of the required edit items has not been entered.

BLDDOC checks to see if a document is complete when saved. If it is not complete, a screen will appear listing the edit items that still need to be entered. BLDDOC will also check to see if the document is complete when edited. An asterisk (*) will appear next to the item description in the edit item table when the item is required and still needs to be entered.

The following edit items are required for an IBM dataset:
  a. Name/Desc/Prod Area—(includes: dataset name, dataset description, production area, data owner, and data sensitivity).
  b. Jobs References
  c. DCB Attributes
  d. Medial Type
  e. Catalog Considerations
  f. Retention
  g. Record Formats The following edit items are required for an IBM VSAM dataset:
  a. Name/Desc/Prod Area—(includes: dataset name, dataset description, production area, data owner, and data sensitivity)
  b. Jobs References
  c. DCB Attributes
  d. Record Formats The following edit items are required for an HP file:
  a. Name/Desc/Prod Area—(includes: file name, file description, production area, data owner, and data sensitivity)
  b. Jobs References
  c. File Attributes
  d. Media Type
  e. Record Formats
  f. Retentions The following describes the procedures for issuing a dataset document through BLDISS. The name and version of the Issuance Control Member (ICM) built through BLDISS must match the name and version of the document to be issued. Duplicate issuances are the exception to this. A duplicate version must take the form of 'ANNA' where 'A' is an alphabetic character and 'N' is a numeric character. The 'ANN' part of a duplicate version must match the version of the document to be issued as a duplicate.

Dataset documents are issued through the Build/Edit section/function. Enter the name and version of the document to be built or edit and hit enter. The analyst name panel is then displayed. Enter the data in the analyst name panel and hit 'ENTER' to get to the edit item selection list. Select the items to be edited, or hit 'END' and a prompt is displayed for all of the required items that need to be entered.

The following items appear in the edit selection list:

| | |
|---|---|
| a. Project Information | Required |
| b. Destination | Required |
| c. Implementation Date | Required |
| d. Transmission Dataset | Not Required |
| e. Coordination | Not Required |
| f. Dataset Cluster | Required when the destination is corporate |
| g. Reason for Issuance | Required |
| h. Comments Data Processing | Not Required |
| i. Commments Issuance Unit | Not Required |

A new ICM is built using any existing ICM as a model. This includes using a duplicate as a model. A duplicate ICM cannot be built if:
  a. The document to be issued as a duplicate has not been created or stored in a 'Not Complete' status.
  b. The original version of the ICM does not exist (e.g., the duplicate ICM cannot be built if the original ICM does not exist).

To issue a dataset document as a pilot, build the ICM for the document new and issue it to the pilot destination. Any further issuances of the same document to additional destinations after the pilot can be duplicate.

Regional Support production is a valid destination for document issuances. Regional Support Test issuances is not a valid destination. Therefore, any document to be used for Regional Support should be built through BLDDOC, printed to hardcopy and sent to Regional Support. Regional Support will also be able to print off a hardcopy of the document through BLDDOC. An Issuance Control Member may be built for the document through BLDISS, but do not generally mark it "READY FOR ISSUANCE". By not issuing the document it will remain in a test status and can still be edited. The document may be marked "READY FOR ISSUANCE" when the testing is complete and the document is ready for production.

When a dataset document is complete and the ICM has been created the Issuance Processor may be submitted through BLDISS. The Issuance Processor is submitted by marking an ICM "READY FOR ISSUANCE". A document cannot be marked "READY FOR ISSUANCE" if it is in a 'NOT COMPLETE' status. The Issuance Processor will:
  a. Create an audit trail of the issuance.
  b. Verify that the document meets as many standards as possible.
  c. Print an Issuance Memo and Issuance Control Sheet for Issuance Administration.
  d. Print a Data Dump of the ICM for the person who created the ICM.
  e. Print a sign off sheet to be signed by the dataset owner. This will be routed back to project coordinator listed for the document. The sign off sheet will be created only when the dataset is a new dataset or when an existing dataset whose retention information has changed.

The Issuance Processor will validate the following items:
  a. A Vital or Disaster dataset must not have disk as a media type.

b. Only one cluster is allowed for Vital or Disaster datasets with a corporate destination. The cluster is used to update corporate Vault Pattern Dataset.

c. The destination of ICM must agree with the location of the dataset specified on the document.

d. If the location specified on the document is corporate only or regional only, differing information is not allowed.

e. If a dataset is a preallocated disk dataset, space allocations must be specified.

There is a "Validate Document" facility in both BLDISS and BLDDOC. This facility may be used to precheck any document for the errors specified above. The facility produces an audit trail outlining the success or failure of the validation.

The responsibilities of the user of the Dataset Documentation Automation Systems are to review the audit trail from the issuance processor. This audit trail will be returned to the analyst or librarian that built the ICM in the Document Issuance Facility. It will be the responsibility of this person to recognize whether a document was issued successfully or encountered an error. If an error occurred, appropriate changes must be made and the component must be remarked "READY FOR ISSUANCE".

Issuance Administration will serve as a point of control to answer any questions regarding errors encountered in the issuance process. The project coordinator will be responsible for returning the sign off form to Issuance Administration.

The responsibility of Issuance Administration is to serve as a point of control to answer any questions regarding dataset document issuances. Issuance Administration will review the dataset document when it is marked ready to ensure the document meets standards. If the document is in error, the issuing analyst will be notified of the error and will be instructed to correct it.

As can be readily seen, the procedure for implementing dataset document changes is quite complex and involved. The prior art system requires entering data on multiple screens. The data that is entered is gathered after analysis, design, and testing have taken place. It is required that the same data be entered multiple times if multiple elements are being issued for the same project.

The data is captured and stored in a format known as the Issuance Control Member (ICM). This member consists of strings of data concatenated together through the use of special symbols and item identifiers. This storage method is a carry-over from when the ICM information was stored in strings on Panvalet. The ICM is stored in a 'not ready' status until the analyst determines the element(s) are ready to be placed into production. At that time, the ICM is marked 'ready.'

An issuance processor job runs in batch mode on the Devplex. If the issuance processor job is successful, then the process to distribute the element is initiated. If it is unsuccessful, it is up to the analyst to determine why the issuance failed, fix the problem and mark the element 'ready' again. This cycle continues until the issuance is successful and the process to distribute the element is initiated.

The information for the data is provided to the librarians by the analysts in various ways, including writing on hardcopies of data dumps (copies of previously entered ICMs) and sending the information through e-mail. The data capture is typed in manually by librarians. Very little of the information is derived from outside sources. The librarian may, however, use a 'model' (previously built ICM) to bring some information forward for a new ICM. There are restrictions on what information can be brought forward from a model, requiring some data entry for every new ICM.

If more than 3 related elements are to be issued, a Coordination Control Member (CCM) is used to make sure the elements are grouped and sent to the same implementation sites at the same time. Again, there is much duplicate data entry of information between the ICMs and the CCM. Verification of the data entered about the implementation sites and the implementation dates is a very complex process that can be accomplished by the librarian submitting an audit before the elements are marked ready. The process is also invoked when the CCM is marked ready to ensure that all the elements share the same implementation sites and dates and also that all components contained in the CCM have successfully completed that first phase of the issuance process.

Enforcement of many standards is done when the issuance processor job runs. If any standards violations are encountered, the job is aborted. There are very few ways for the analysts to verify that they are meeting the standards when they are in test mode except to compare their element to the documentation in the DPM (Data Processing Manual) to ensure they are meeting standards.

Accordingly, we have identified the following shortcomings of the current system:

Need for much redundant data entry

Difficulty of adding new element types, sometimes as high as 1000+ analyst hours Inflexibility in how new element types can be added, they must follow the formats previously defined Data capture "after the fact" when all development is done Accordingly, it is desirable to design a computer architecture and process for overcoming the above shortcomings, as described in detail below.

SUMMARY OF THE INVENTION

It is a feature and advantage of the present invention to improve the capture of element metadata by providing a more user friendly interface that will resolve many of the shortcomings of the current system such as redundant, unnecessary, and untimely data entry.

It is another feature and advantage of the present invention to eliminate any current data entry fields that may be obsolete or derived in another way.

It is another feature and advantage of the present invention to:

Reduce redundant data entry;

Capture data at the point where it makes sense to capture it;

Enforce standards throughout the development cycle instead of at the end;

Move responsibility for the data entry and its accuracy to the analyst responsible for the element;

Derive as much information from current sources as possible (example: fabricate analyst information by accessing Department Code tables using IDs);

Provide analysts with better grouping mechanisms in order to facilitate the move of elements into production in a more logical order;

Eliminate some current data entry fields that have been deemed obsolete but have not been removed from the current system; and/or Provide analysts with better feedback concerning errors and standards violations.

The present invention provides the following benefits as well:

Minimizes the risk of overwriting changes made by another developer;

Tracks the changes in archives and makes them easily accessible;

Allows the creation of a copy of an element at any point in its development history;

Allows the management of changes made to files on several platforms; and/or

Allows the access of files across platforms.

The present invention is based, in part, on the identification of the problems associated with the need for consistent, timely, and accurate project implementation/communication to improve the quality of project implementation to all platforms associated therewith. We have realized that by placing the majority of this responsibility in the hands of the developer or analyst accountable for the element changes and by automating implementation tasks, the project quality is extremely improved. The present invention assists members of a project team or analysts to retrieve and build any revision of an application in a consistent and repeatable manner.

The present invention is also based, in part, on the identification of the problem of not properly establishing an appropriate audit trail early on in the element development cycle. In this connection, we have discovered that the audit trail should begin when the element is checked out for development, and continue throughout the development cycle and through promotion of the element into production.

In accordance with the above features and advantages, a revision management system includes an inventory group manager (IGM), a work group manager (WGM), and a version manager (VM). The IGM generates and manages one or more lists for each of one or more elements logically related to each other as one or more inventory groups. The IGM also maintains and manages the lists of the elements in the inventory group and provides new elements to be added to the inventory group. The WGM selects the elements relating to a project that require modification, and selects elements from the inventory groups to form a project work group. The VM tracks and manages the modifications to the elements in the project work group, and generates reports with respect to the modifications responsive to user selectable criteria.

According to another embodiment of the invention, a method of managing revisions to elements is provided. The method includes the steps of generating and managing one or more lists for each of one or more elements logically related to each other as one or more inventory groups, maintaining and managing the lists of the elements in the inventory group, and providing new elements to be added to the inventory group. The method also includes the steps of selecting the elements relating to a project that require modification. The elements that require the modifications for the project form a work group. The method also includes the steps of selecting the elements from the inventory groups to form a project work group, and tracking the modifications to the elements in the project work group. The method also includes the steps of managing the modifications to the elements in the project work group, and generating reports with respect to the modifications responsive to user selectable criteria.

In accordance with another embodiment of the invention, a method of managing revisions to elements using an interactive work flow with a user is provided in a revision management system. The method includes the steps of receiving a request to change an element for a project, locating the element associated with the request for the project, and generating a project work group identifying the project. The method also includes the steps of entering the element associated with the request to the project work group, obtaining a working copy of the element associated with the request, and entering the change to the element. The method also includes the steps of entering the change for archiving, and either uploading host application element revisions to a host for issuance to production, or issuing work station application elements revisions directly to production.

These, together with other features and advantages of the present invention, will become apparent from the following description and the claims taken in conjunction with the accompanying drawings.

BRIEF DESCRIPTION OF DRAWINGS

FIG. 21 is an illustration of an icon key.

BEST MODE FOR CARRYING OUT THE INVENTION

Figure 1:
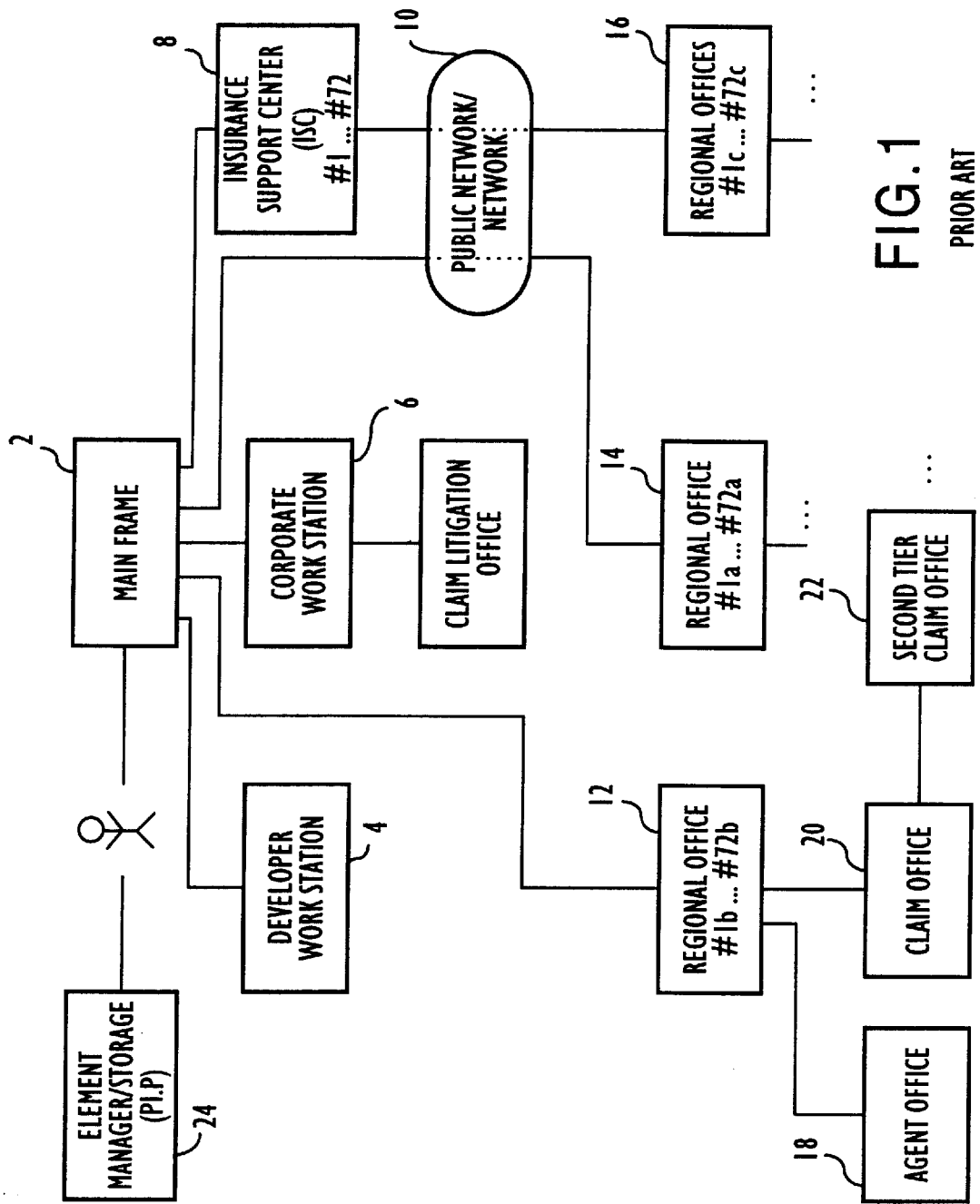
FIG. 1 is a basic block diagram of the overall system architecture in a standard computer system that requires coordination between updating of elements that may be changed by various components in the system.
Figure 2:
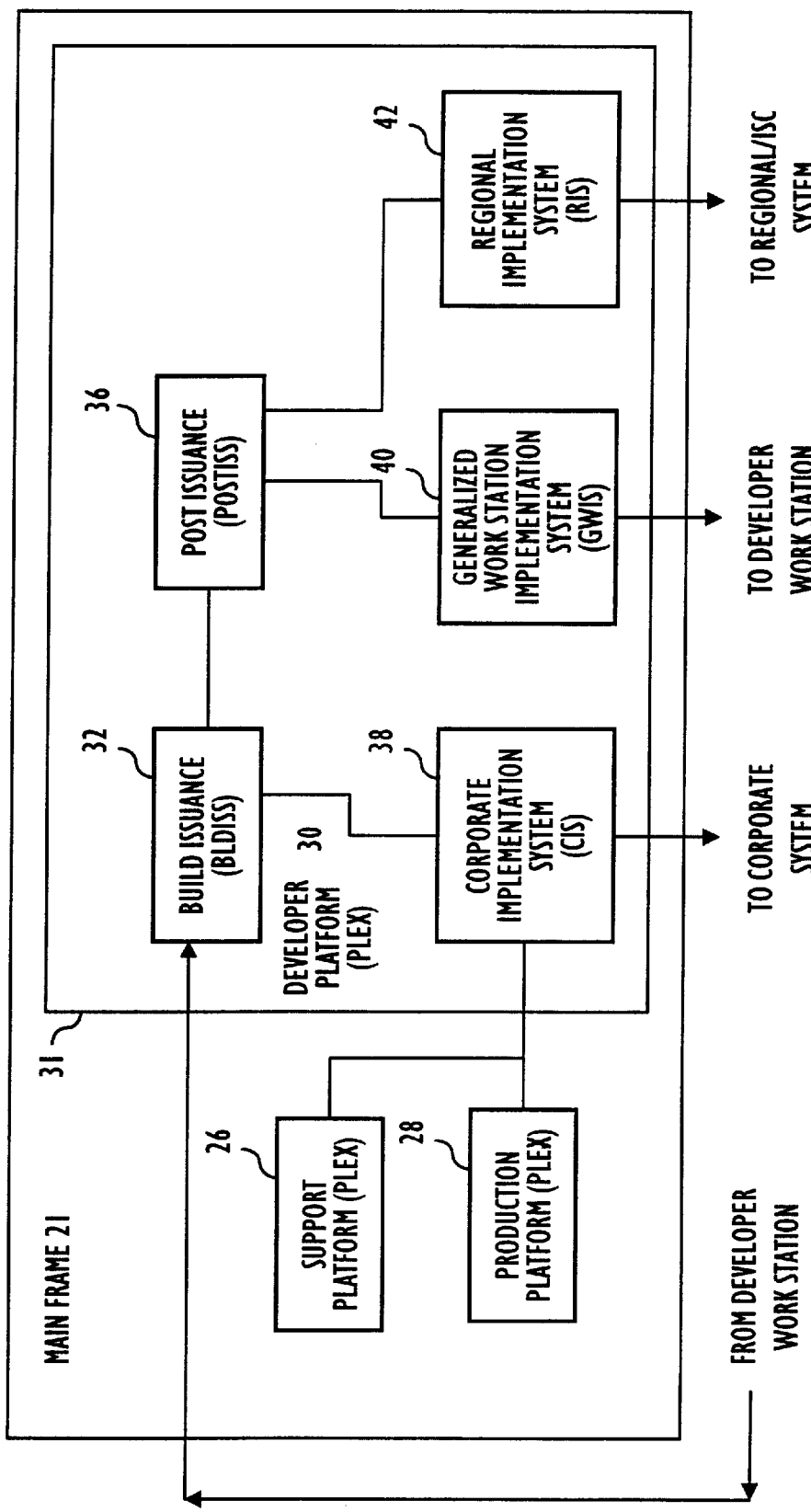
FIG. 2 is an illustration of the basic components of main frame 2.
Figure 3:
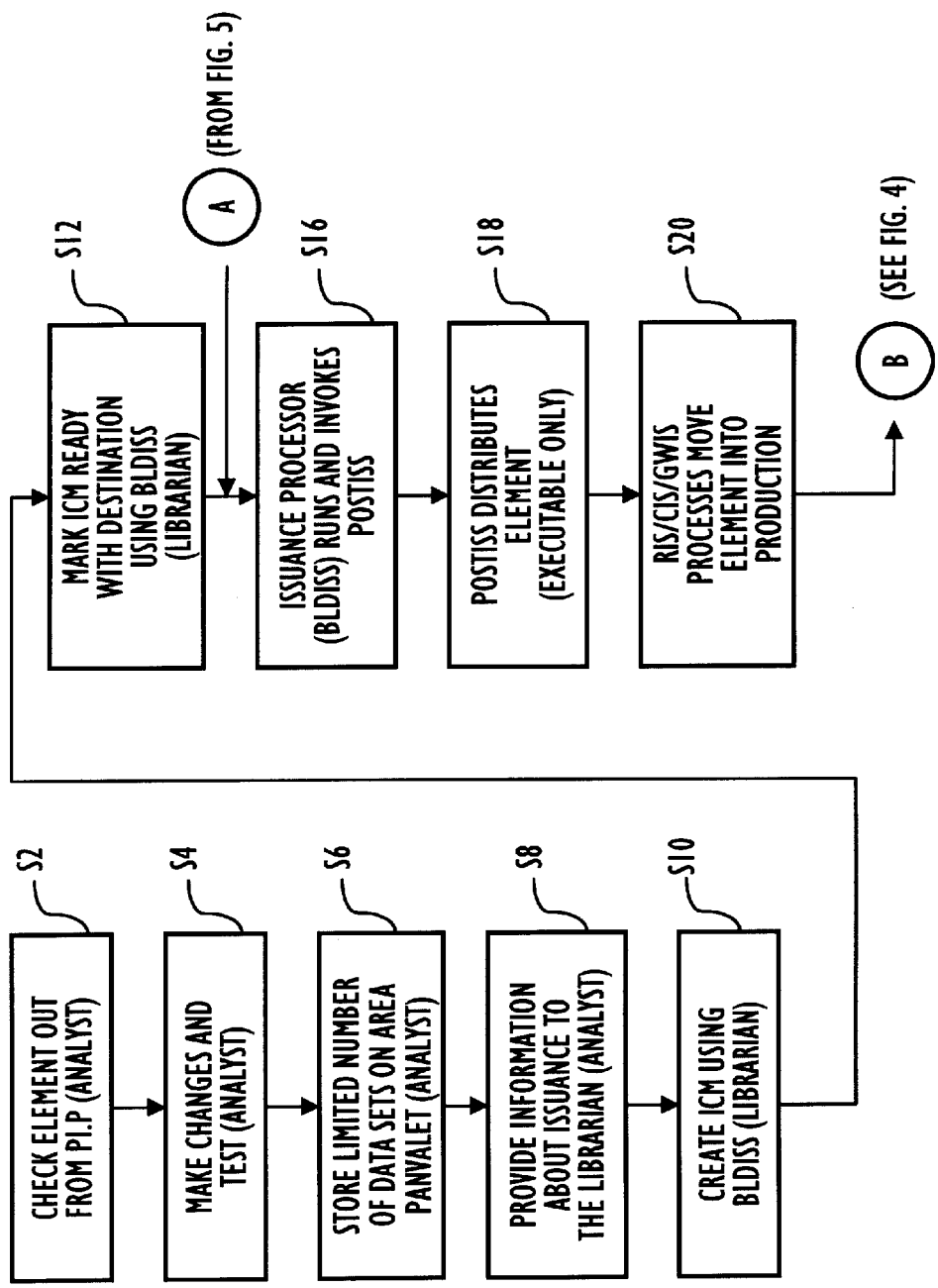
FIGS. 3–4 are flowcharts of the basic flow or process of updating element changes in the prior art system architecture.
Figure 4:
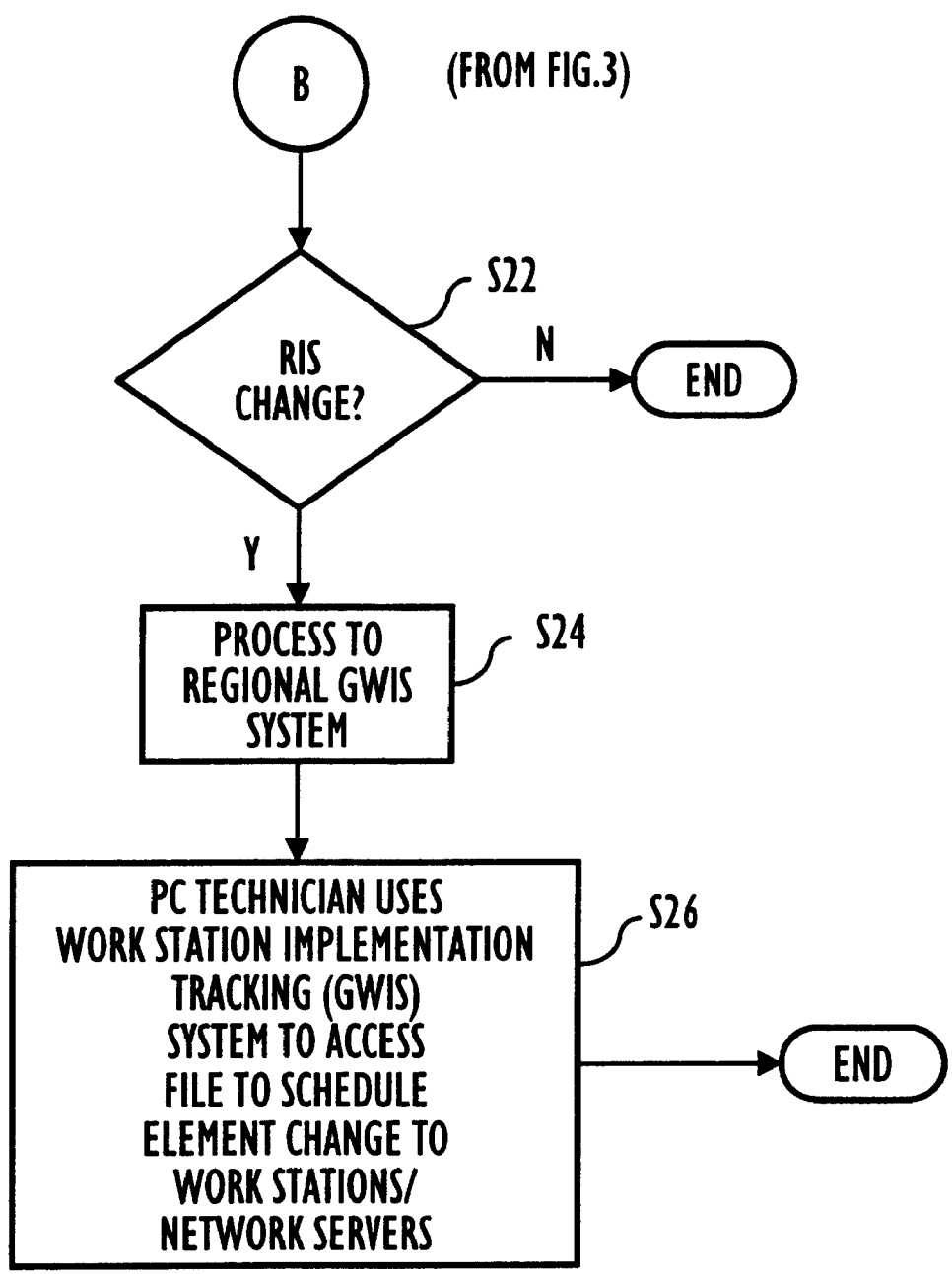
Figure 5:
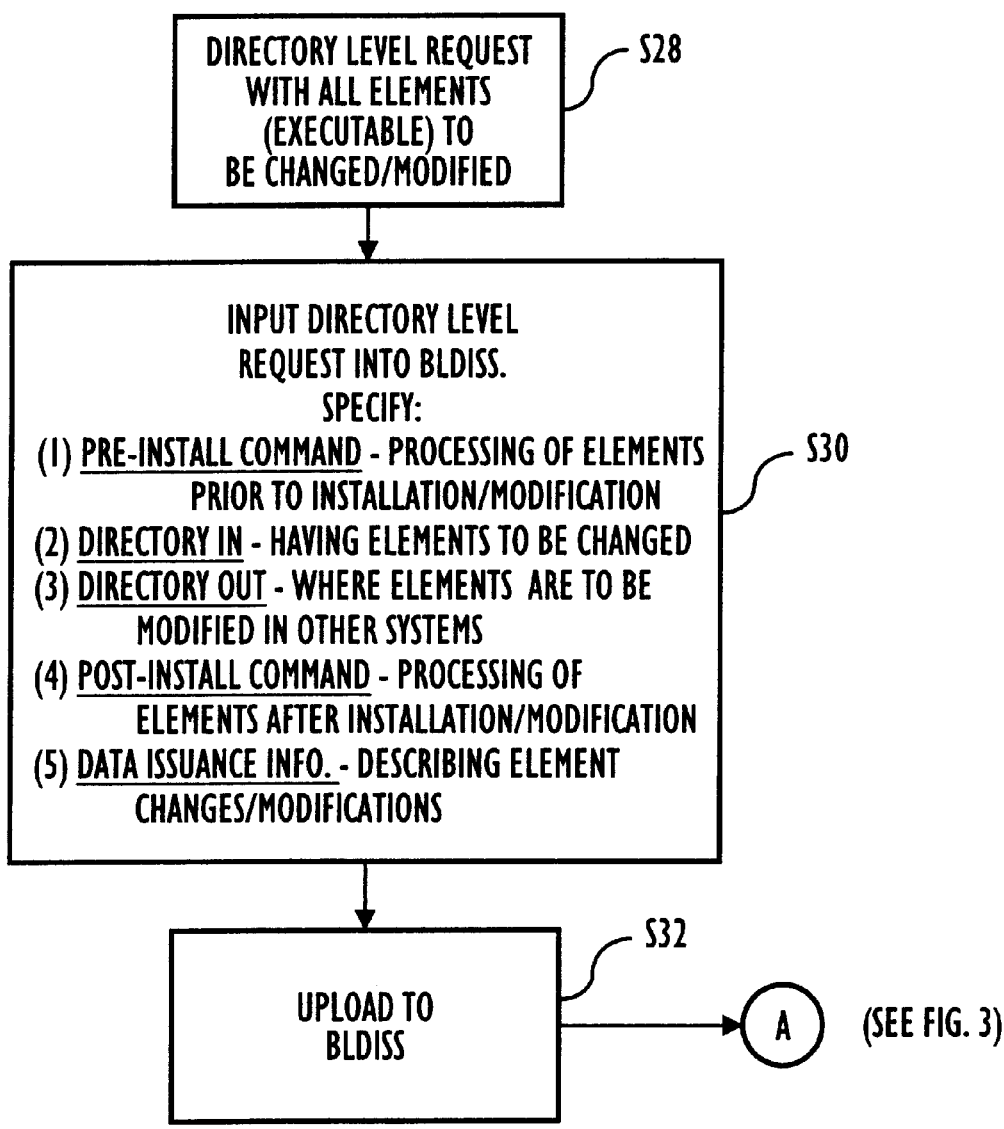
FIG. 5 is a flow chart of the processes utilized by a work station developer.

We have identified a need for a coordinated effort to ensure that the development, issuance, and implementation processes blend to emphasize customer productivity and system efficiency when elements are modified and distributed throughout a distributed computer system. In response to this need, we have analyzed the application development process from project initiation through implementation, and have created a system and process for the development of tools necessary to deliver consistent, timely, and accurate services to effectuate and manage element changes.

We have designed a Revision Management System (RMS) which includes a complete set of tools and services that allows developers and data centers to track and control changes to elements throughout the application development life cycle regardless of the strategic platform the element was developed on, and regardless of the strategic platform the element is to be installed on. An element is defined as a piece of information that has value and requires management as an enterprise resource. For example, source code, documentation, executables, and the like are al considered elements.

RMS includes the process of organizing and managing changes to the elements associated with a development effort. RMS helps members of a project team retrieve and build any revision of an application in a consistent and repeatable manner. RMS uses inventory and work groups to track who is modifying an element and what is being modified. RMS keeps a master copy of all elements and a historical record of the changes to the elements. This historical record is called an archive.

RMS control is the process of managing and maintaining multiple revisions of the same file in an archive. This archive maintains information about the changes in each revision of a file. RMS allows project team members to retrieve, modify, and store any revision of a file in a secure and consistent manner. RMS satisfies the following functions:

Development Support—the purpose of this function is to provide a consistent, intuitive interface to RMS customers. This interface will allow wide and powerful access to RMS data that will give customers more leverage to work with a larger number of elements with less interaction.

Consistent, Timely, and Accurate Project Implementation and Communication—the purpose of this function is to improve the quality of project implementation to all platforms by placing the majority of this responsibility in the hands of the developers accountable for the changes and automating as many of the implementation tasks as possible.

Secure Elements—the purpose of this function is to ensure that all elements are protected, maintained, and accounted for.

Adaptability—the purpose of this function is to ensure that RMS is designed in a consistent, logical, and extensible manner to reduce the future impact of change.

Usability—the purpose of this function is to ensure that the systems developed are user-friendly, efficient, and accessible.

Single Production Element—this will create a single root for elements to be based on in the RMS inventory. If multiple versions of an element exist, development areas will need to determine which version to place in the RMS inventory as the root.

We have further determined that resistance to changes brought on by RMS is expected due to a change in work flow, an increase in developer accountability, a change in how elements are versioned, and/or a decrease in autonomy due to the introduction of automation. We have further determined that because of the size and scope of RMS, a single implementation of its services will not be practical. Sub-projects are initiated to satisfy one or more logically related RMS objectives. Certain RMS sub-projects will be introducing services that impact all aspects of the development life cycle (for example, development, distribution, and implementation).

The major RMS system functions that are performed as follows:

Collect issuance control data
Secure production elements
Prepare elements for implementation
Move issuance elements to their destinations
Provide maintenance, archival, and access to production libraries
Provide tools for application development and issuance activities
Provide audit trails and Issuance Administration reports
Provide methods of installing elements at various destination sites; and/or
Provide communication and coordination facilities to assist in implementation In addition, RMS also performs the following functions/process:

Capture metadata about elements
Where possible, provide on-line editing to do certain checks that are done in a batch mode today
Provide grouping concepts that can replace the current grouping mechanisms of using Coordination Control Members (CCMs) and Special PITs (SPITS)
Provide the capability of capturing the metadata so that it applies to as many elements as possible at one time We have designed RMS to utilize client/server technology to achieve platform independence and to support various development and production environments. The key to enabling RMS functions is a logical arrangement of the elements to facilitate tracking purposes. Arranging the data in a relational format enables RMS objectives related to grouping and packaging to be implemented effectively and efficiently.

RMS performs revision management services on different development systems, such as IBM and HP host machines. These revision management functions are invoked by the RMS interface and include services such as check-in, check-out, element merging, and regression checking. RMS brings all developers under the same interface and provides them with the same revision management tools. Since all developers would be on a level playing field, RMS functions added to the interface would be available for use by all.

There are several benefits resulting from the implementation of RMS:

Elimination of redundant data entry. Today, metadata about elements is entered for every element being issued and also on the CCM (Coordination Control Member). By capturing the data at the highest level possible and applying it to the elements within the release or implementation group, for common information, it is necessary to only enter this information once to have it applied to all elements in the group.

Better grouping concepts. With the release and implementation group concepts, the analysts are able to coordinate elements in a more logical way than they do today.

More accurate metadata about elements. Today, the analyst provides the information about the issuance to the librarian to be entered into BLDISS. By retrieving some of the vital metadata, such as analyst name, from other sources using ID, the metadata will be more accurate. Also, since analysts will likely be entering the metadata instead of the librarian, some accountability can be assigned to the analyst to be sure the metadata is accurate.

Early capture of the metadata for use in cross-referencing, querying, etc. Today, the entry of the issuance metadata is 'after the fact.' Since checkout, development, and testing are all done, there has been no audit trail of who is doing what before the element is moved into production. With RMS, the audit trail begins when the element is checked out for development, and continues throughout the development cycle and through promotion into production.

Figure 6:
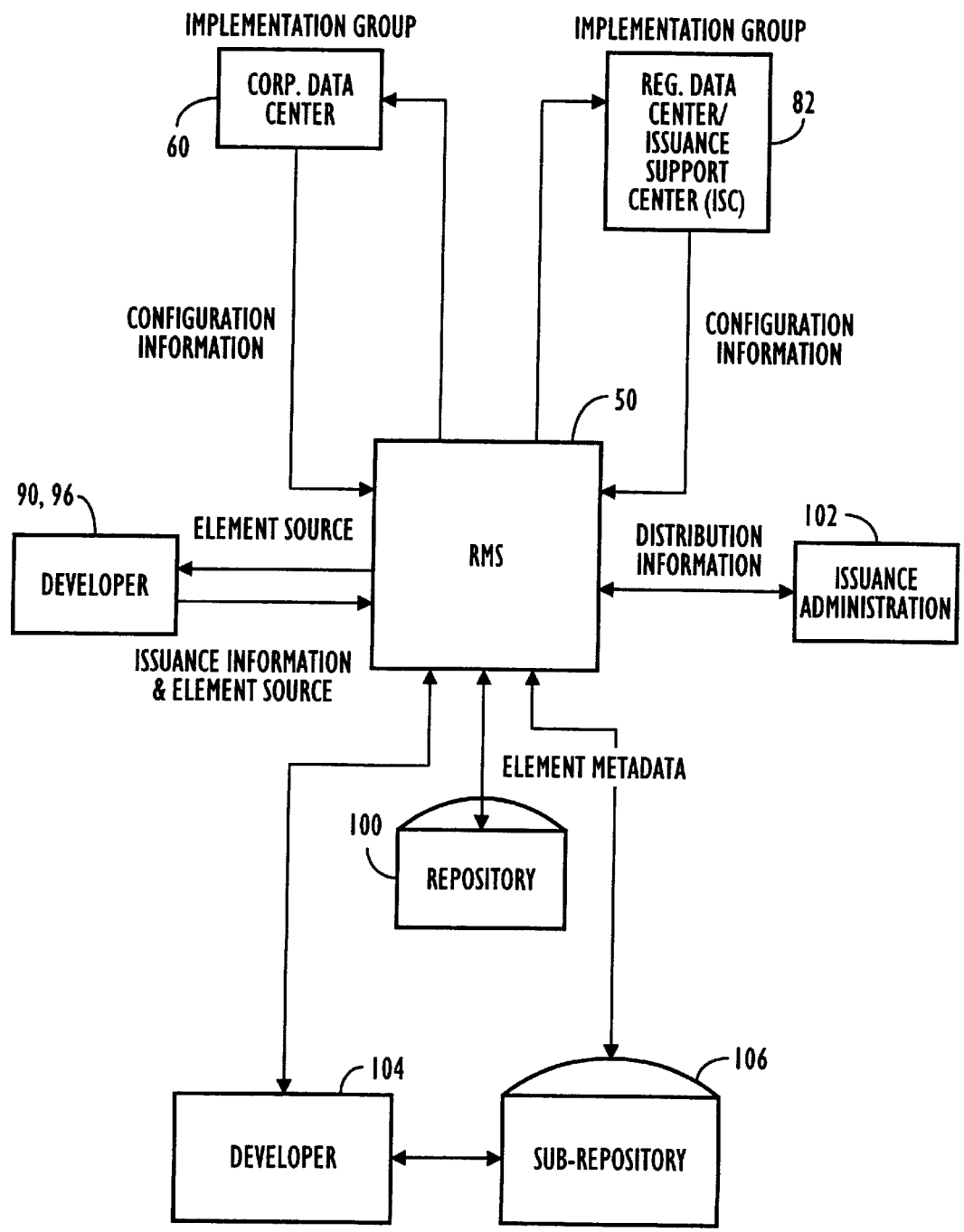
FIG. 6 is an overall block diagram of the system architecture for RMS.

FIG. 6 is an overall block diagram of the system architecture for RMS. In FIG. 6, RMS 50 interfaces with the various components/systems in the distributed computer system. RMS interfaces with corporate data center 60, and regional data center/issuance support center (ISC) 82 with respect to managing and updating configuration information, described in more detail below. RMS interfaces with developer 90, 96 with respect to management and updating of element source information and issuance information, described in detail below.

As depicted in FIG. 6, developer 90, 96 have access to the RMS repository 100 via coordination by RMS 50. RMS 50 also includes a sub-repository 106 that may be directly accessed by developer 104. Sub-repository 106 may be directly updated or modified by developer 104, or updated by developer 104 via the coordination of RMS 50.

The developer 90, 96 and/or 104 is anyone developing elements that need to be implemented on the distributed computer system. The developer interfaces with RMS to manage element changes during the development life cycle. When the development and validation are complete the developer uses RMS to distribute the element to the sites for implementation.

Regional data center 82 is a destination for elements being issued to the regional offices and their associated remote sites. The regional data centers use the RMS system to interface with and manage the implementation of production elements.

Corporate data center 60 is a destination for elements being issued to corporate. The corporate data center uses the RMS system to interface with and manage the implementation of production elements.

Issuance administration 102 monitors elements being distributed to the data centers. Issuance administration monitors the system and makes any adjustments necessary for the distribution of elements to the data centers. Issuance administration also is the first level of support for the data centers for RMS problem resolution.

Repository 100 is a corporate information store. The repository centralizes all information about the business and the applications which support it (application and business metadata). The repository provides RMS with the ability to store and retrieve element specific information.

Sub-repository 106 is an optional corporate information store dedicated for developer 104. The sub-repository centralizes predetermined information that is a subset of repository 100 about the business and the applications which support it. The sub-repository provides RMS with the ability to store and retrieve a subset of element specific information.

Figure 7:
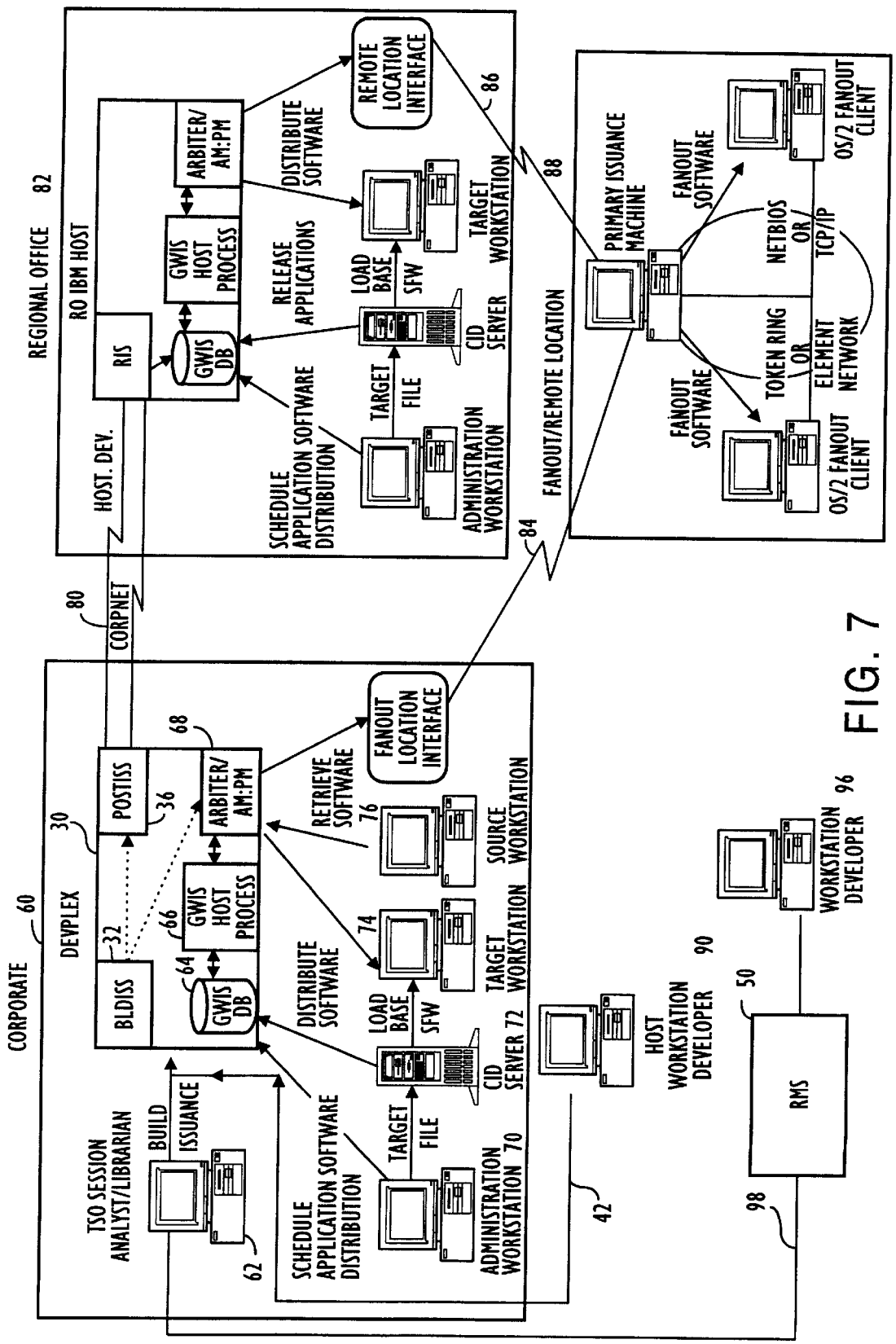
FIG. 7 is a block diagram of the workstation implementation of RMS according to a first phase/transition configuration.

FIG. 7 is a block diagram of the workstation implementation of RMS according to a first phase/transition configuration. In FIG. 7, RMS 50 is utilized by workstation developer 96 for entering the appropriate element change information, including what element needs to be issued, who is issuing the element, when does the element need to be issued, and where does the changed element need to go for update purposes and why. RMS 50 is then accessible via route 98 to librarian station 62. A librarian may then manually input of the element information into developer platform 30 of corporate/main frame 60. Alternatively, RMS 50 may directly input the element change information directly into the developer platform 30.

Developer platform 30 is used to update the regional office 82 via line 80, as well as remote location 88 via interface 78 and line 84. Remote location 88 may also be updated via regional office 82 and line 86. Developer platform 30 is used to update target workstation 74 via GWIS database (DB) 64, GWIS host 66, and ARBITER/AM:PM 68, all of which are discussed in detail below. Source workstation 74 is optionally used to retrieve software/elements for changing, and effectuate such a change via RMS 50. Administrative workstation 70 sets or determines the priority scheme for updating of the workstations based on the update queue in ARBITER/AM:PM 68 via a target file stored on server 72.

GWIS (pronounced Gee-WIZ) is an acronym for Generalized Workstation Implementation System. GWIS automates the distribution and installation of workstation application software to OS/2 workstations and servers in corporate, regional, and remote locations. This provides a method to effectively install and remove application software. GWIS allows application software updates to be sent electronically to one or more workstations, eliminating the need for manual diskette distributions.

GWIS encompasses the application software distribution function, as well as, the load/reload function used for system software installation. Arbiter/AM:PM, WIT, the CID Server, Fanout, and Profile components are described in detail below.

Arbiter/AM:PM—Third party product from Tangram Enterprise Solutions that can be thought of as the middleware for the software distribution process. It provides an intelligent file transfer process and a method for initiating and monitoring workstation tasks. It is a host-based system that can be used to deliver software to workstations with a direct connection to the IBM host.

WIT—Workstation Implementation and Tracking. WIT is an ENFIN application that resides on the Infrastructure administration workstation. It is used by the workstation issuance technician to define and load workstations, schedule software distributions, and follow up on distribution status.

CID—Customization, Installation, and Distribution. CID is a concept developed by IBM that allows software to be installed using the product's own install process, and eliminates the need for diskettes and input from the keyboard. CID concepts are used by the load/reload system to install the base system software (OS/2, Communications Manager, DB2/2, LAN Requester, and GWIS) from the CID Server. CID concepts are also used to install some application software. However, this installation occurs through the application software distribution process and not through the CID server.

Fanout—Fanout is a two-tiered software distribution process, mostly used to deliver software to remote locations, but its use is being expanded to other sides. Software is delivered to a machine, called the Primary Issuance Machine (PIM), which then controls the delivery of the software to other workstations. Fanout processes support, for example, TCP/IP communication, TCP/IP SLIP (dial-up) communication, and NetBios communication.

Profile—A profile is a combination of hardware and/or software components in a single package that serves the needs of a particular group of workstation users. Profiles are used for ordering workstations, loading workstations and controlling issuances to workstations.

BLDISS provides both regional and corporate GWIS Issuances. Typical issuances consists of one or more file transfer steps and the execution of a pre-installation and/or a post-installation script. Scripts perform application specific installation tasks.

The issuing analyst also has the option of displaying a message on the end-users screen when the issuance process completes. During the BLDISS session, the analyst has a choice of using a standard message, a customized message or no message at all. There are two types of messages: successful messages and unsuccessful messages.

All audit information regarding the distribution and installation of the software is sent back to the host. This information is used to provide an accurate status for each workstation and for problem determination and accountability. This status information is available through GWIS on the Devplex.

Analysts initiate and schedule software updates using the BLDISS application. BLDISS communicates the information supplied by the analyst to the AM:PM host component. Information regarding what software is to be sent, what workstations are to receive the updates, and when should the updates be scheduled is relayed to the AM:PM host component.

The AM:PM host component builds a schedule for each workstation and communicates that schedule to the AM:PM Alarm component on each workstation. On the scheduled date and time the work station "calls" the host and executes the scheduled job. Jobs typically consists of one or more file transfer steps followed by the execution of an installation process.

All audit information regarding the distribution and installation of the software is sent back to the host. This information is used to provide an accurate status for each workstation and for problem determination.

If a workstation meets the above requirements, receiving a distribution is very simple. To receive a distribution the AM:PM Alarm program must be active on the workstation. The AM:PM Alarm program is automatically started when the workstation is booted. Therefore, the workstation is normally in a state to receive software at all times without any user involvements.

Because GWIS does not require any user involvement, it is described as an unattended software distribution process. Unattended indicates that the application software updates can be applied without the user being present. Currently, GWIS is unattended, but it is not transparent.

Analysts may need to communicate the changes to the users prior to distributing the software. The primary reason for prior notification is to make sure the software application that is being updated is not active. If the application is active during the distribution process, the distribution process will likely fail. Applications that are not being updated, can be active during the distribution process with no side effects.

Figure 8:
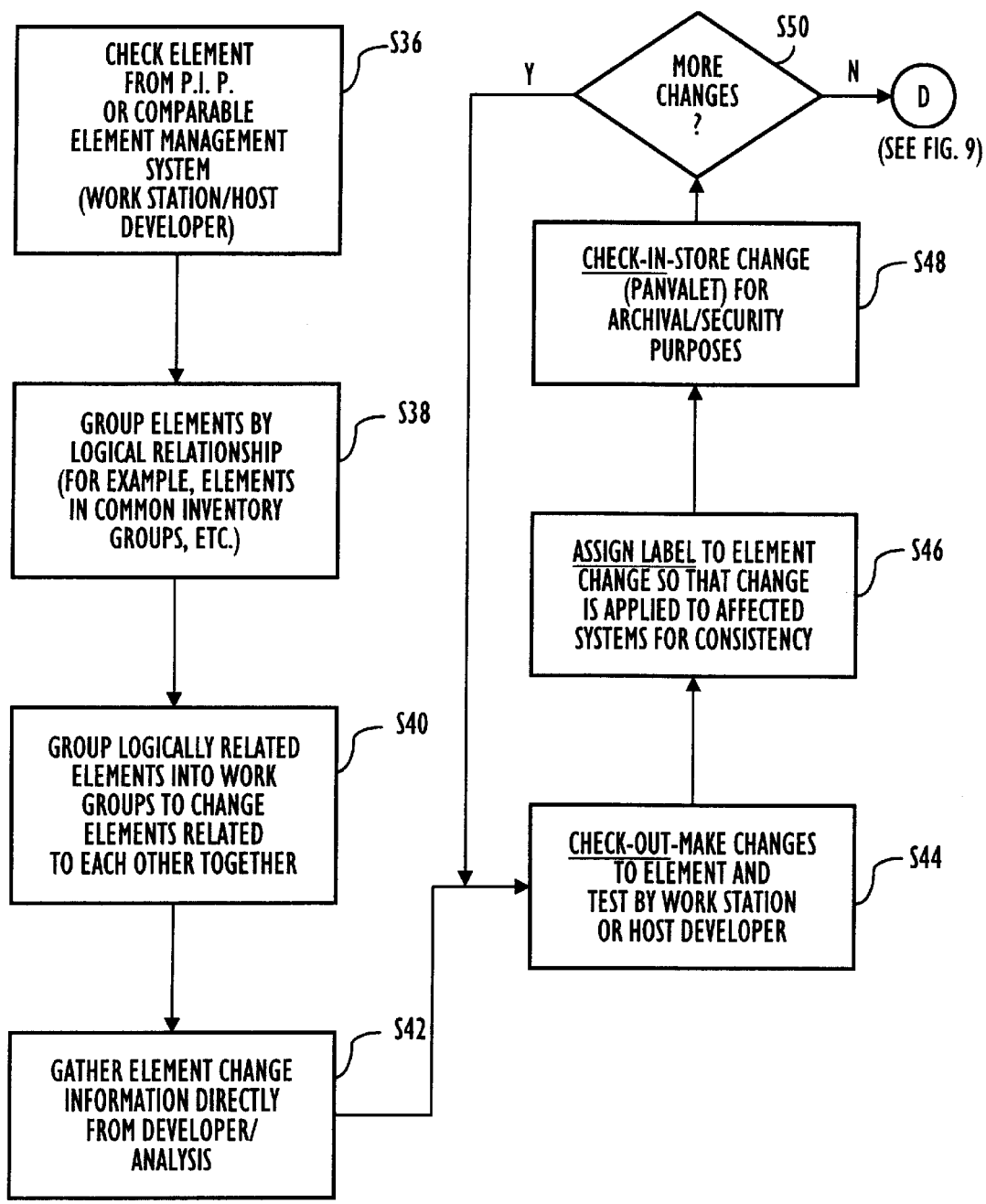
FIGS. 8–10 are flow charts of the basic revision management system process in accordance with a first design.
Figure 9:
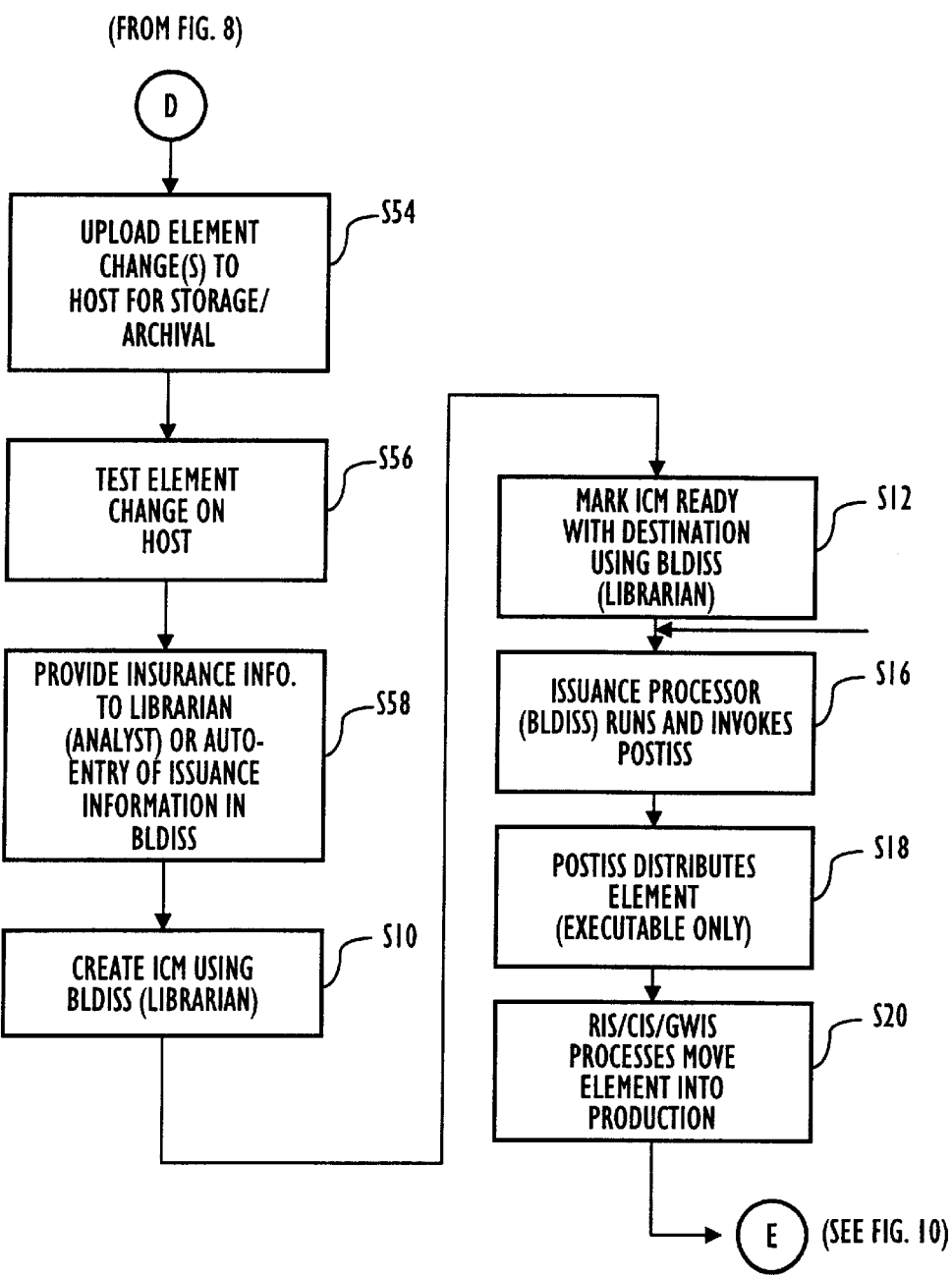
Figure 10:
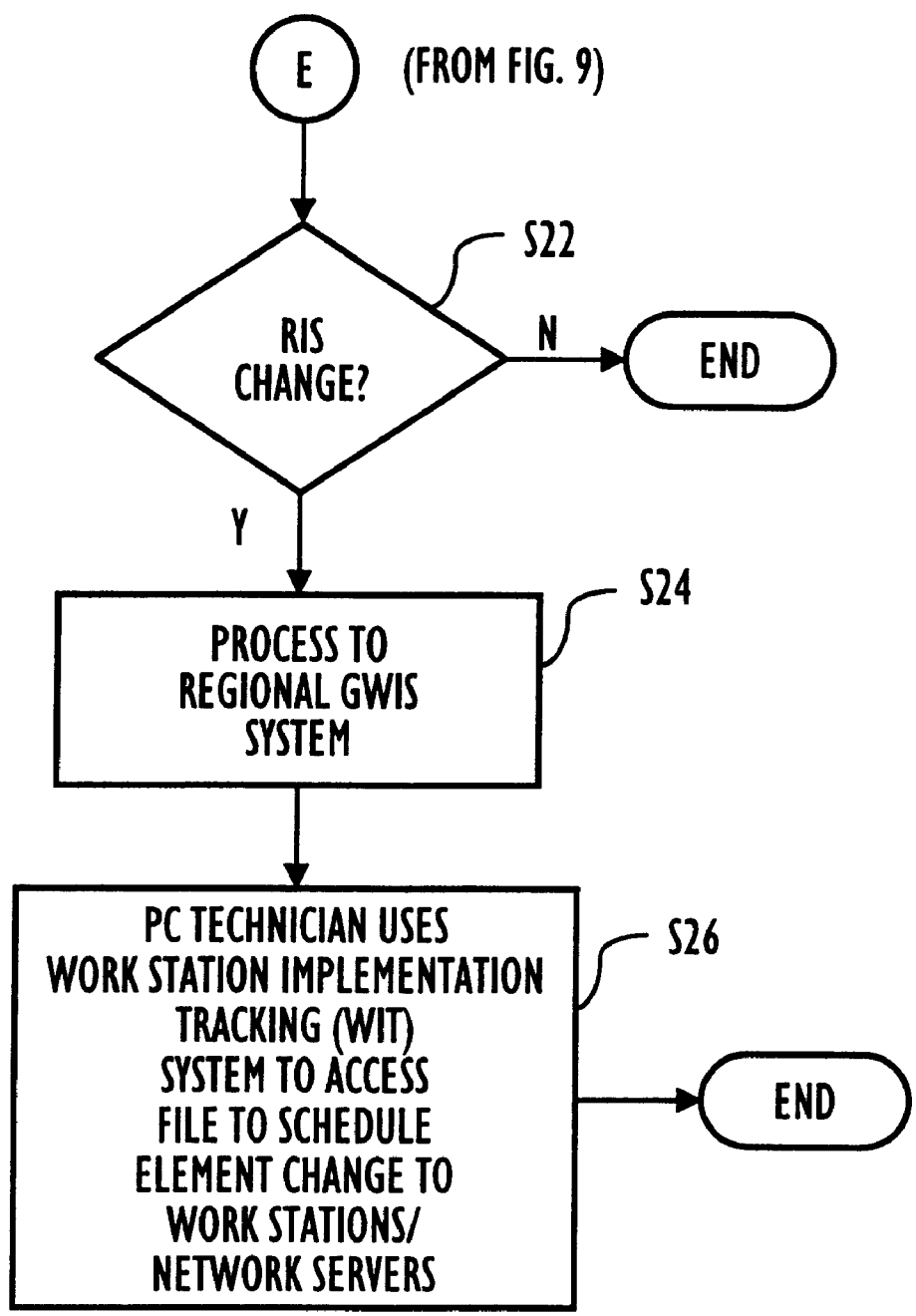

FIGS. 8–10 are flow charts of the basic revision management system process in accordance with a first design. In FIGS. 8–10, an analyst checks or retrieves an element from PI.P or other comparable element management system to be modified, edited and the like, in step S36. Elements are then grouped by logical relationship in step S38. For example, elements may be grouped in accordance with a common inventory group, discussed in more detail below. Elements are then grouped into logically related work groups in step S40. This allows or facilitates elements within the same work group to be changed together or substantially simultaneously.

Element change information is then gathered directly form the developer or analyst in step S42. The analyst then checks out the modified element, and tests the modified element (in the workstation or host developer) in step S44. After the element has been satisfactorily tested and the analyst is satisfied that the element is ready to be distributed throughout the system to the appropriate components, a label is then assigned to the element to ensure that the appropriate version of the element is used to update the affected systems in step S46. The element is then checked in an area panvalet for initial archive and security purposes in step S48.

The analyst is then queried for additional changes in step S50, and if no additional changes are necessary, the element or elements that have been modified are uploaded to the host for storage/archival purposes in step S54. The element is then tested on the host in step S56. Assuming that the testing provides a satisfactory outcome in step S56, issuance information is provided to the librarian, analyst or even directly to BLDISS (or other comparable system) in step S58. The remaining steps of the RMS check out/check in process have been discussed above.

This check out procedure is typically done by the workstation developer or host developer. This procedure is not intended initially for the host developer working on a stand alone workstation, essentially for interface management reasons. However, the host developer on the workstation will also eventually perform the same or similar functions as the other developers.

Figure 11:
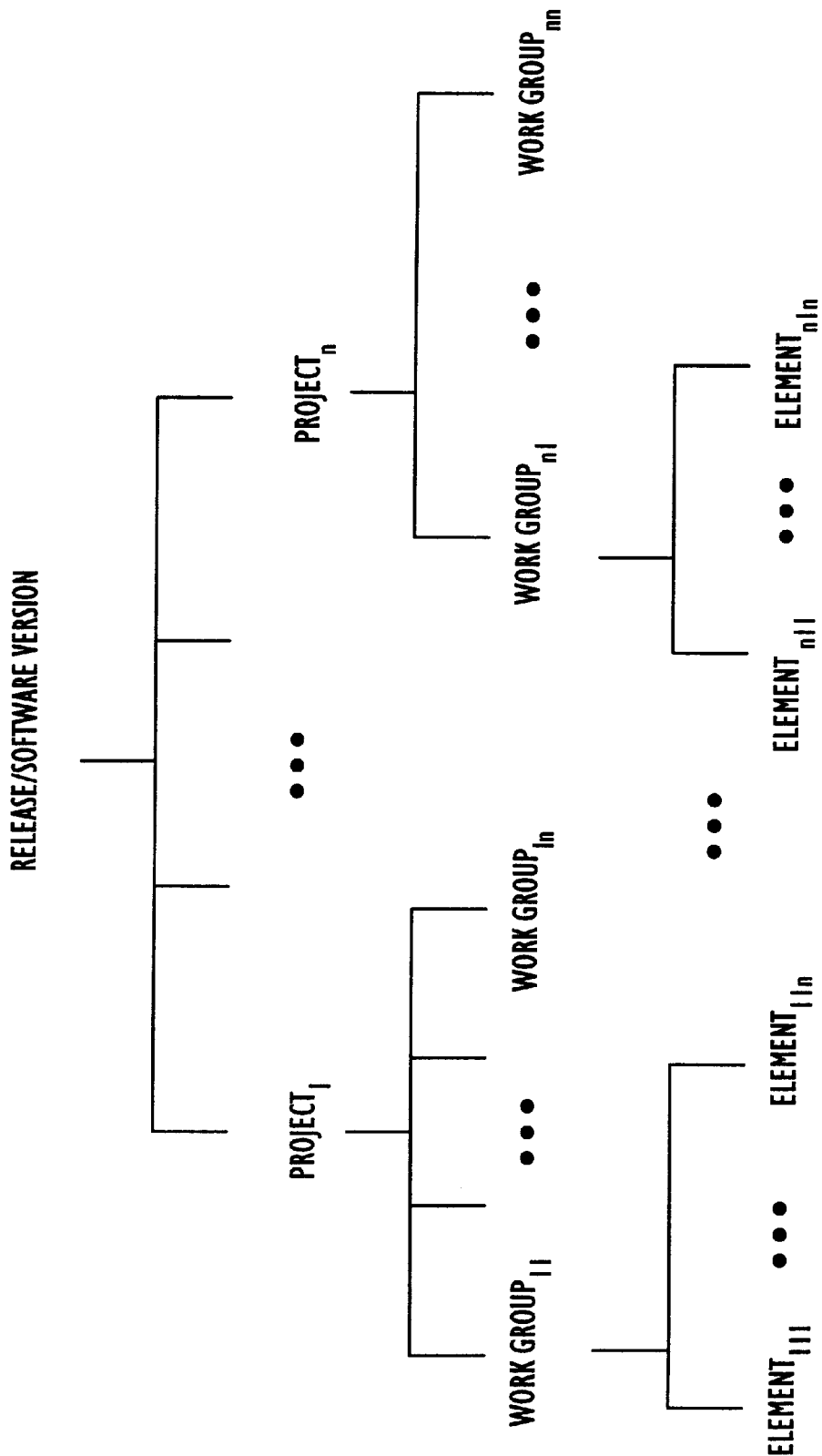
FIG. 11 is a conceptual tree diagram of the organization of the element data to facilitate the updating and maintaining of element and element change information.
Figure 12:
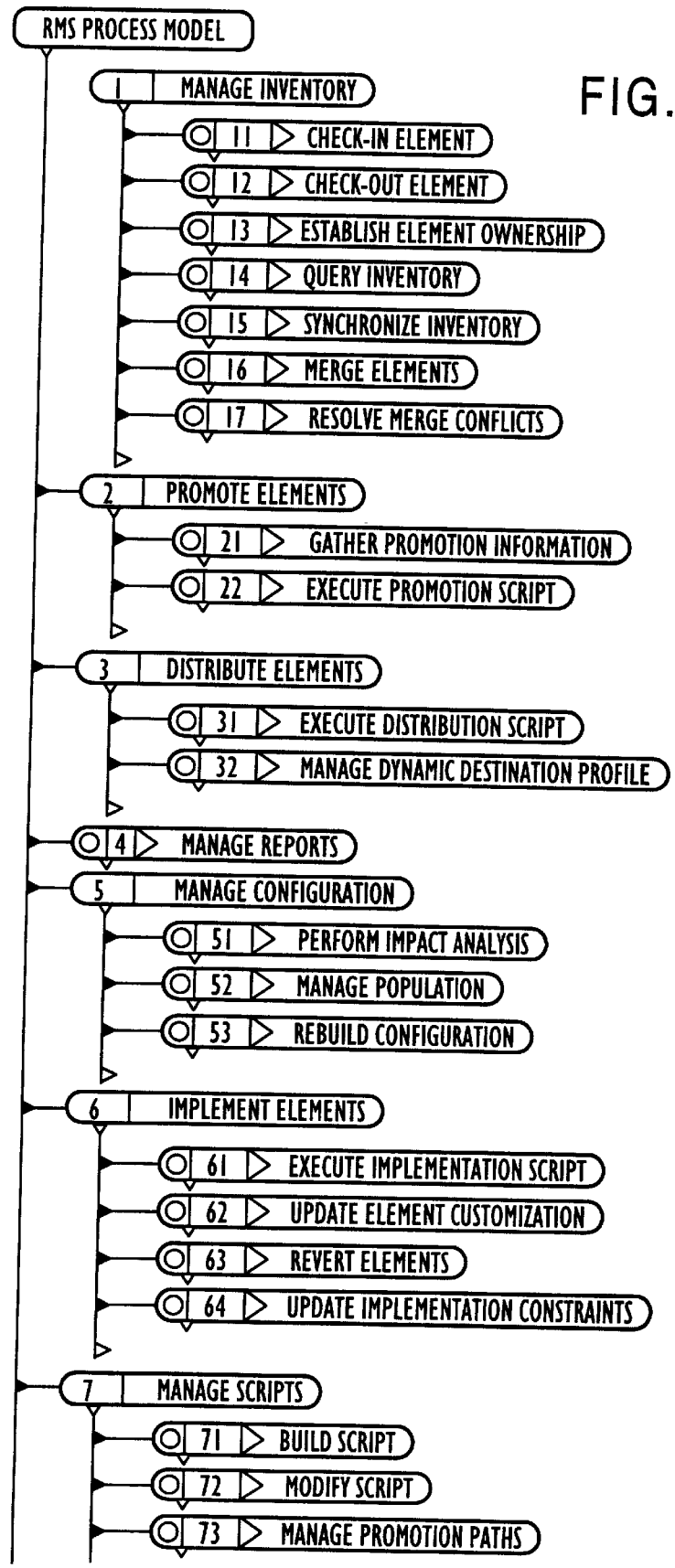
FIG. 12 is a process model indicating the overall different functions of RMS.

FIG. 11 is a conceptual tree diagram of the organization of the element data to facilitate the updating and maintaining of element and element change information. As illustrated in FIG. 11, a software version or release comprises project-1 . . . project-n. A project comprises work group-1 . . . work group-n. A work group comprises element-1 . . . element-n. As is discussed in detail below, this organization or data structure facilitates the management of element in RMS and throughout the distributed computer system. FIG. 12 is a process model indicating the overall different functions of RMS.

The processes performed by RMS are now described in detail. Revision management is the process of organizing and managing changes to the elements of a development effort. It helps members of a project team retrieve and build any revision of an application in a consistent and repeatable manner.

RMS uses inventory and work groups to track who is modifying an element and what is being modified. RMS keeps a master copy of all elements and a historical record of the changes to the elements. This historical records is called an archive. An element in RMS is defined as a piece of information that has value and requires management as an enterprise resource.

Revision control is the process of managing and maintaining multiple revisions of the same file in an archive. This archive maintains information about the changes in each revision of a file. It allows project team members to retrieve, modify, and store any revision of a file in a secure and consistent manner.

The advantages of revision control are as follows:
1. Minimizes the risk of overwriting changes made by another developer.
2. Tracks the changes in archives and makes them easily accessible.
3. Allows the creation of a copy of an element at any point in its development history.
4. Allows the management of changes made to files on several platforms.
5. Allows the access of files across platforms.

RMS contains the:
Inventory Group Manager
Work Group Manager
Version Manager

The Inventory Group Manager provides a flexible way to create lists of elements related in some logical way. The Inventory Group Manager maintains multiple views of lists of all elements in its warehouse. The Inventory Group Manager also allows new elements to be added to the inventory.

For example, all the modules and documentation for an application (e.g., PSRMS) may be placed in one group and all utility modules in another group. The same element can be in more than one group to make it easier to locate and manage.

Groupings are global. Inventory group names must be unique since everyone can see the same group names. Elements can be grouped in any way that fits the developer environment. All references to an element are pointing to the same physical file. New elements are created within an existing inventory group.

The Work Group Manager allows you to select elements that relate to a project and require changes. A work group is a logical collection of elements needing changes for a specific project. The Work Group Manager allows elements to be selected from Inventory Groups to form a project Work Group. Elements assigned to a work group do not have to be in the same inventory group. Work groups do not have to contain all the elements of an Inventory Group. A project manager can create a work group, and multiple analysts can access the group.

Elements can be chosen from any inventory group. It is not necessary to choose all members of an inventory group. A unique, meaningful name must be assigned to the new project work group. The work group name is used in the version label and short names will be easier to read. Additional information can be added in the work group description.

The Version Manager provides a way to track changes to elements. The Version Manager tracks the changes to those elements and provides additional benefits such as difference reports and merging. It is used to manage coding and document changes to the elements in a work group. The Version Manager allows developers to:

Automatically handle concurrent development changes to a single element.

Check out a copy of an existing element.

Check in the revised copy with its changes.

Merge changes in two revisions.

Report differences between two revisions or work files.

The following is a description of the work flow using RMS. A request for change is received, or a problem exists that requires changing some elements. The analyst uses the inventory manager to locate the elements that must be changed for this project. Next, the analyst uses the Work Group Manager to create a project work group with a meaningful name. The elements that need to be changed are then added to the work group. The analyst then uses the Version Manager to obtain a working copy of the elements that need to be changed by checking them out. The required changes are made using the appropriate development tools. The changes are checked into RMS to secure them. Host application element revisions are uploaded to the host for issuance to production and work station application elements revisions are promoted to production.

The purpose of RMS is to organize and manage the changes to the elements of information that have value. The Work Group Manager allows elements to be selected from inventory for a project. The Version Manager tracks changes to an element. The Inventory Manager keeps track of all elements and allows viewing of elements them through different groups or different views.

New elements are created in the Inventory Manager. An element can be in more than one inventory group. An element can be in more than one work group. Checking out allows a copy of an element to be retrieved for the purpose of making changes. Checking in allows RMS to record the history of changes to the revisions of the element. This historical record is its archive.

The following is a description of how RMS stores information concerning the history of elements. Included in this description is how revision numbers are assigned, using version labels, and to interpret archive information for a specific revision.

The first time a new element is entered into the RMS inventory, it is assigned an initial revision number of 1.0. The first revision element is a copy of each instance of an element. Each time, thereafter, the element is modified and put into production, it becomes a new revision. Production revisions form the trunk. The trunk is defined as the main line of development for an element. It is always a production revision. The trunk is the development path which stems from the original element.

A branch is a line of development. A branch is defined as a separate line of development consisting of one or more revisions that diverge from the trunk. Development branches start from a production revision on the trunk. A parallel branch of development can be initiated from a revision contained within a development branch. This allows development of alternate revisions of the same element for different projects. The most recent revision in a development branch is referred to as the tip.

The following examples will track, in chronological order, the revision number of an element from its creation, through its development, and to its issuance to production.

Figure 13:
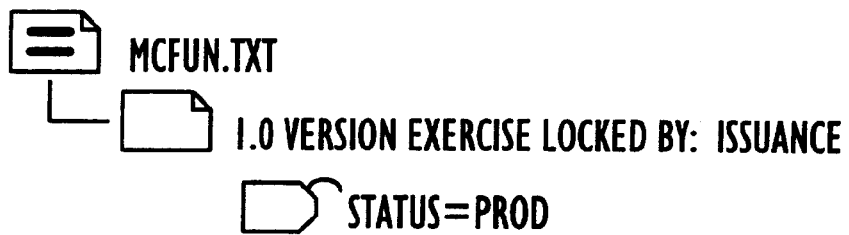
FIGS. 13–19 are pictorial views of different stages of element development and management in RMS.

A new element (e.g., MCFUN.TXT) is established in the inventory manager. RMS assigns it an initial revision number of 1.0. An expanded pictorial view of the element's history is illustrated in FIG. 13.

To start the development of MCFUN.TXT, it must be checked out. Checking-out creates a new development branch. The first development branch from a trunk revision appends 1.0 to the trunk revision number creating a revision number of 1.0.1.0. If a second line of development were started, it would have 2.0 appended to the trunk revision creating a revision number of 1.0.2.0.

Figure 14:
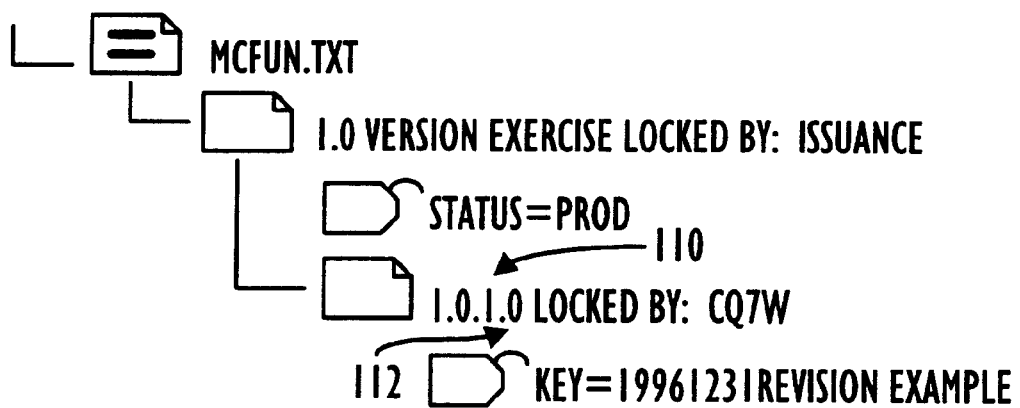

After checking-out the element, the resulting work file is edited in the appropriate development editor. FIG. 14 illustrates at position 110 the development branch number. Position 112 indicates the number of times the work file has been checked in.

When editing is complete, or when the work in progress needs to be backed up, the work file is checked into the Version Manager for the purpose of recording the changes to the element's history. Once checked in, the work file becomes revision 1.0.1.1 (see position 114 of FIG. 14).

Figure 15:
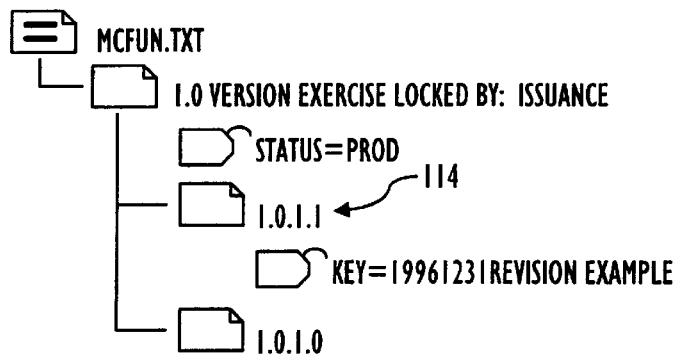
Figure 16:
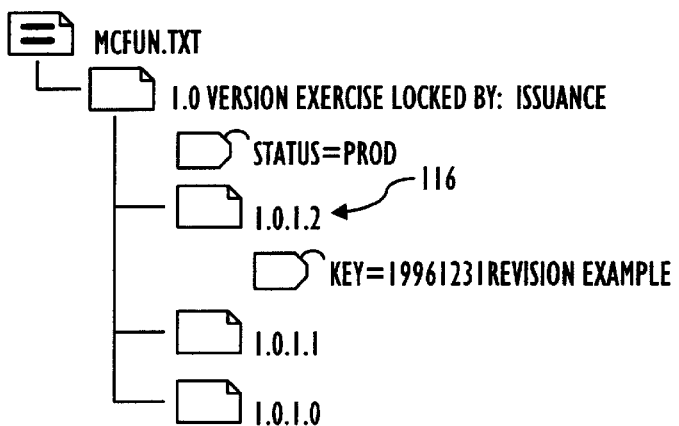
Figure 17:
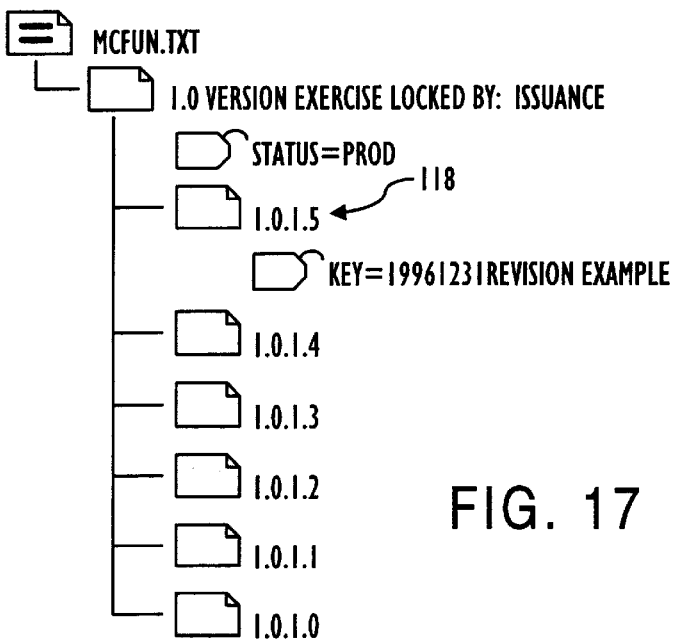

To continue development on this element, it is checked out from the tip revision (1.0.1.1). When it is checked in the second time, the new revision number for the tip become 1.0.1.2 (see position 116 of FIG. 15). As development continues and the work file is checked out and in again, the last position of the revision number continues to increment by 1. After five check-ins the revision number would be 1.0.1.5 (see position 118 of FIG. 17).

In this example, the element has been completely tested and ready for issuance to production after five check-ins.

Figure 18:
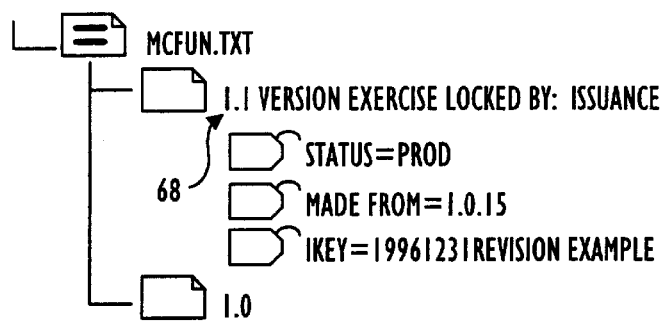
Figure 19:
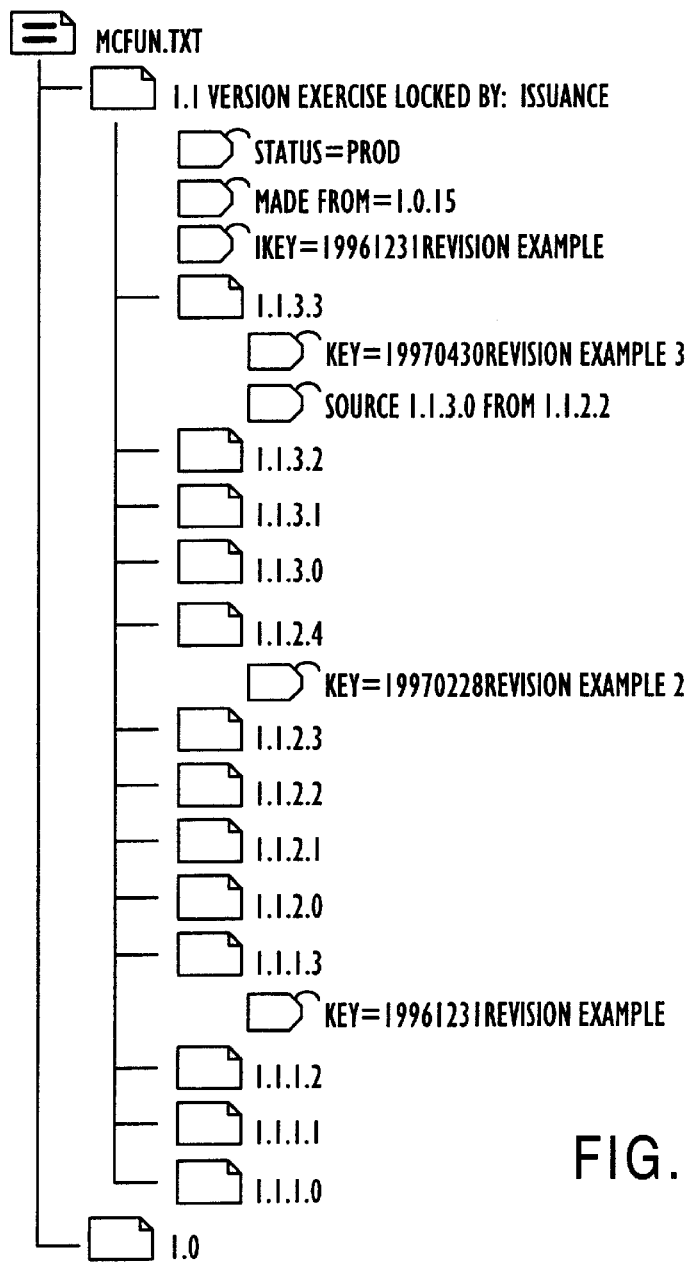

When development revision 1.0.1.5 is issued to production, it will become the trunk revision 1.1. As new production revisions occur, the second position of the trunk revision number will be incremented by one (see position 120 of FIG. 18). FIG. 19 shows three branches of development on the MCFUN.TXT element after its first release to production.

Revision numbers for elements which are already in production at the time they are introduced into RMS are assigned a revision number of 1.0. Each time a new production revision is issued, the revision number is incremented, 1.1., 1.2, 1.3, etc. The first position of a trunk revision number will always be 1. Elements that were formerly stored in CMU (Change Management Utilities) will retain their existing revision numbers when converted to RMS.

A version label is a symbolic name assigned to the tip of a development branch. Version labels can only be used to retrieve the tips of development branches. This provides a convenient way to refer to a tip by a meaningful name. Revision numbers need not be remembered to check out elements. Instead, RMS references elements by their version labels. The types of versions labels are:

| Version Label | Description |
| --- | --- |
| STATUS=PROD | Identifies the latest production revision. |
| KEY=key | Identified the test revision by effective date. |
| IKEY=key | Identified the issuance key be effective date. |
| IPKEY=key | Identified the issuance key by pilot date. |
| IRKEY=key | Identifies the issuance key by Regional Support date. |
| PKEY=key | Identifies a test revision by pilot date. |
| RKEY=key | Identifies a test revision by Regional Support date. |
| HOSTVER=X99 | Identifies the three position host version, where X99 is an alpha followed by two numeric characters. |

See, for example, FIG. 19 illustrating version labels.

Key is an alphanumeric string in the format, yymmddworkgroupname, where yymmdd is the year, month, and day of the date, and workgroupname is the work group name assigned to the project. RMS uses the combination of the date (Effective, Regional Support, or Pilot) and the work group name to create the version label for the element. Version labels provide a way to retrieve a work group of related elements even when their revision numbers are different.

Host and LAN backups are made regularly and are transparent. In contrast, developers are in control of backing up the work station. If many changes are made to an element, the RMS check in function may be used to backup changes several times during the day. If only a few changes are made, checking in once a week may be sufficient. RMS is the perfect way to backup your work station development.

Figure 20:
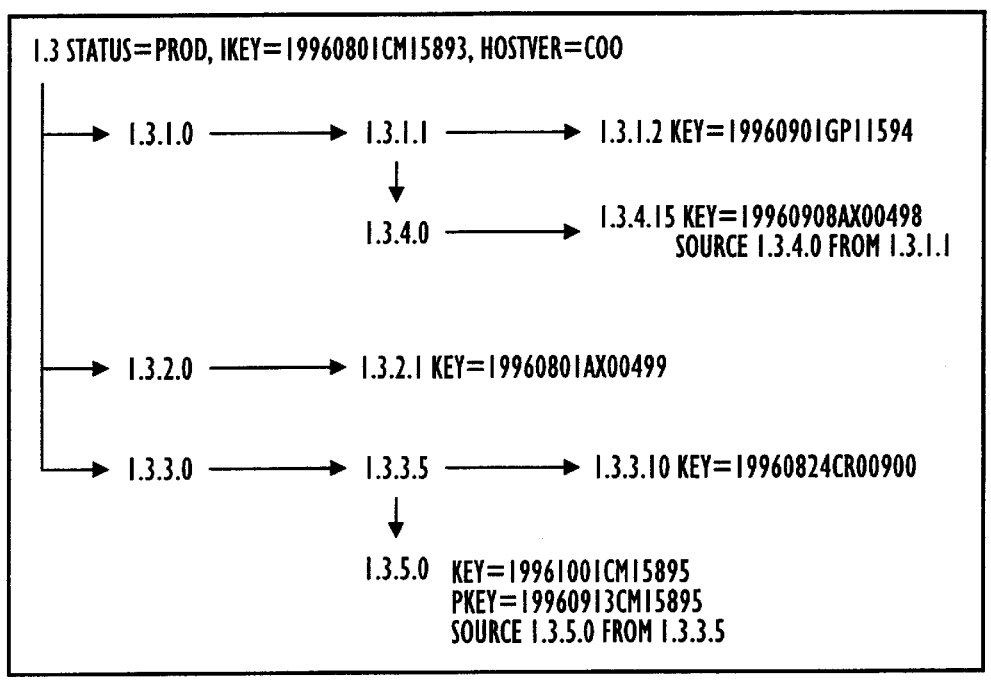
FIG. 20 is an illustration of another RMS example where the work group name identifies the project and the revision number identifies the tip.

In FIG. 20, the work group name (PRS #) identifies the project and the revision number identifies the tip. The effective date of work group AX00498 is 9-8-96. The pilot date of revision 1.3.5.0 is 9-13-96. The Host version of the production revision is C00. The work group name of version 1.3.3.10 is CR 00900. Work group AXZ00498 was sourced from Revision 1.3.1.1. The work group name and effective date associated with the production revision are CM-15893, 8-1-96. Work groups GP-11594, AX-00499 and CR-00900 and tips 1.3.1.2, 1.3.2.1 and 1.3.3.10 are branched directly off the trunk. Revision numbers: 1.3.4.15 and 1.3.5.0 and Work groups AX-00498 and CM-15895 are branched from other branches. KEY=identifies the test revision by effective date, and PKEY=identifies the pilot key that is associated with tip 1.3.5.0.

The check out and check in procedures are now described in greater detail.

RMS Check Out allows the developer to retrieve a copy of an element from the RMS master (archive) to a work group (project) directory. Check out allows the developer to retrieve a production copy of the element, a development copy of an element previously checked into RMS, or any other revision currently stored in RMS. Typically, the expanded tree view is used to help you decide what to use as your source (production, project effective date, etc.)

To select an element to check out, select a specific revision from the expanded tree view. RMS will automatically place that revision number in the revision field. To check out, highlight the desired element(s) from the work group list and select the check out option.

The revision chosen from which the developer will check out a work file is very important. If check out is required from another project, the Version Manager creates a new branch which contains the source from that project. The new branch has a version label indicating from where it was sourced. The developer selects the revision or version label from which to check out and to indicate which type of work file is needed.

A selection list shows available version labels from which may be chosen a source. A revision from the tree view may also be selected prior to selecting the check out option. Most of the time, a developer will initially check out an element from production. Subsequent check outs are usually done from work group name. Some areas regularly check out from other development branches, but special care must be taken when selecting this type of check out. The development version label will be the "KEY=. . . " field which contains the work group's effective date and work group number.

There are three types of work files that can be checked out.

Read only

Writable with Lock

Writable

The first is a "Read only" copy. This work file will have the read only attribute associated with it and may be browsed in an editor or word processor. The Read only copy is not updatable, nor can it be checked back into RMS. No changes to the archive information are made when a "Read only" copy of the element is checked out.

The second, which is used most often, checks out a "Writable with Lock" work file of the element and puts it in a project working directory. "Writable" means that it can be modified in an editor. "With Lock" means that RMS has updated the archives to show that the element is checked out. When this type of work file is created, RMS updates the archive noting the location of the source, work group name, the project date, and the LAN logon ID when it is checked in. If a branch does not already exist for the current work group, a new branch is created and all development for that work group is stored in the branch. If a branch already exists, then the tip of that branch is checked out and locked.

The third choice is the "Writable" work file. This is a work file which can be modified in a text editor, but is not being tracked in the RMS archives. No changes to the archive information are made when a "Writable" copy of the element is checked out.

When checking out an element from production, or any element that is locked by another user, the following message is provided that says the revision number is already locked: "Apply additional lock?" Reply "Yes" for this prompt.

When checking out an element, RMS retrieves a copy of the appropriate revision from the archive, and places it into a working directory. If a "Writable with Lock" copy of a work file is being retrieved, RMS will also update the archive version and lock information.

The Version Manager will be pointing to the working directory specified when the work group was created. Check out places a copy of the archive in this working directory. Expanding the tree view of the archive will show that a new development branch has been created and is locked by your LAN logon ID. After checking out an element with a lock, the next step is to make changes to the work file in the working directory.

RMS Check In is the process of taking the element from a working directory and returning it to RMS. During the check in process, RMS copies the changes to the element from the working directory to its archive on the LAN, it releases a lock on the element, updates the archive information, and cleans up the working directory depending on the type of check in option selected.

When selecting a revision of an element to be checked in, be sure that the revision is associated with the work group currently being worked. Otherwise, the check in will error indicating that the Version Manager could not find the locked revision. The element name, not a revision number, should be selected for check in. Options for the work file after it is checked in include:

Delete Workfile—deletes the working copy in the working directory.

Keep Read-Only Workfile—keeps a read-only copy in the working directory.

Keep Workfile Locked—checks in the element and immediately checks it out again. This is used to save the changes to RMS.

The check in with the Delete Workfile option is typically used when changes to the element have been completed. The check in with the Keep Read-Only Workfile option is useful if this element is used as a model for another element later on.

Check in with the Keep Workfile Locked option is useful to backup elements in RMS but continue with development changes. For example, a developer might want to back up the element when a major milestone is reached in a project, or before the developer goes home for the weekend. This option is generally chosen when the developer is not finished with all element modifications but it is desirable for RMS to have a record of the changes made to this point.

It is important to realize the work station is a computer not a terminal. Therefore, problems can be encountered on the work station that would not occur on the host. It is important that the development work is saved, and released from the development editor before checking in an element into RMS. In this context, "released" refers to closing the file or exiting the editor. Failure to release an element will cause undesirable results.

Depending on the source code editor, two different error conditions may occur if an "unsaved" element is attempted to be checked in:

1. an error message showing the element is locked, or
2. an element will be checked into RMS without current changes.

Accordingly, revision management is the process of organizing and managing changes to the elements of a development effort. It helps members of a project team retrieve and build any revision of an application in a consistent and repeatable manner. RMS uses inventory and work groups to track who is modifying an element and what is being modified. RMS keeps a master copy of all elements and a historical record of the changes to the elements.

Revision control is the process of managing and maintaining multiple revisions of the same file in an archive. This archive maintains information about the changes in each revision of a file. It allows project team members to retrieve, modify, and store any revision of a file in a secure and consistent manner.

Revision control minimizes the risk of overwriting changes made by another developer, and tracks the changes in archives and makes them easily accessible. Revision control provides the creation of a copy of an element at any point in its development history, allows the management of changes made to files on several platforms. Revision control also provides the access of files across platforms.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

GLOSSARY

BRANCH OF DEVELOPMENT—an element's isolated line of development. For example, if the same module were being modified in conjunction with two projects, concurrently, and the changes were to be kept separate, this would require two branches of development.

BUSINESS ANALYST—a person involved in constructing (providing business analysis and requirements) and validating models, but is not expected to use the BACHMAN/Analyst tool to update models.

CHECK-IN—the act of introducing an element modification into the Revision Management System.

CHECK-OUT—the act of retrieving an element from the Revision Management System for modification.

CLIENT/SERVER—an automated business function that has been split into two or more different processes that may be physically located on one or more computers. Also known as cooperative processing and distributed computing.

CONCURRENT DEVELOPMENT—an element being modified by two or more developers at the same time.

CONFIGURATION MANAGEMENT—a process that can project the impact of a change on related elements and rebuild past versions or releases of elements or systems.

COOPERATIVE PROCESSING—see CLIENT/SERVER.

CUSTODIAN—an individual who is responsible for the support of an element.

CUSTOMER (specifically, RMS Customer)—any direct user of RMS processes that depends on RMS to perform any portion of their State Farm job responsibilities.

DATA ADMINISTRATOR—a person responsible for coordinating the RMS data along with all the transactions to support the data.

DATA CENTER—any one of State Farm's self-contained locations with the purpose of supporting customers who access State Farm's business data via computer technology. State Farm's Regional Offices and the Corporate Data Center comprise all of State Farm's data centers.

DATA MODELER—a person responsible for creating and maintaining the project data model. It is important for the data modeler to understand data modeling concepts and to know how to use the BACHMAN/Analyst tool.

DATABASE ENGINEER—a person responsible for defining a physical database. This person will also perform the forward and reverse engineering tasks with the BACHMAN/DBA tool.

DELTA—a set of changes made to an element stored in an element storage mechanism.

DESTINATION GROUP—a name to identify a set of network addresses that have something in common.

DEVELOPMENT BRANCH—a series of revisions that diverge from a trunk revision.

DEVELOPMENT ROLE—a concept which represents what type of role (responsibility, authority, expertise, development work, interest) an employee or work force segment plays on an element.

DISTRIBUTION MANAGEMENT—a process that controls the movement of elements from a secured location to a specified destination. This mechanism is responsible for tracking element and package movement and communicating the success or failure of transmissions.

DYNAMIC DESTINATION PROFILE—a listing of the network addresses that comprise a destination group.

ELEMENT—a basic software or documentation entity that fits the following definition:

Any piece of electronically-stored data whose changes require, at a minimum, security, archival, and version control. Data types that fit this definition often require additional revision management services such as distribution and implementation into an execution environment.

Examples include: PL/1 source code, JCL procs, HP non-JCL/UDC, copybooks, DB2 bind statements, Autoflow charts, rate tables, REXX, icons, and operating systems.

ELEMENT COMMUNICATION MANAGEMENT—a function that provides customers a means of communicating information about an element or group of elements to aid in their delivery or maintenance in the business environment.

ELEMENT END PRODUCT—the output of a revision management generator. If a generation process is not applicable to an element, the source is the element end product.

ELEMENT INVENTORY—a set of databases containing all elements and element metadata for all element types in the development and production environment.

ELEMENT INVENTORY MANAGEMENT—a function that provides customers a means to maintain and secure elements and the information about them. This information includes who is working on the element, what stage of development in the life cycle the element is in, what project the element is associated with, etc.

ELEMENT INVENTORY VIEW—a customized view of the inventory of elements under RMS control. Criteria for customizing inventory views include element name, element type, grouping id. Multiple views can be created and updated as needed.

ELEMENT MERGING—see MERGE.

ELEMENT PROFILE—information about an element which can change independent of the element.

ELEMENT PROMOTION ADMINISTRATION—a function which allows authorized customers to perform administrative functions on information required by the promotion process.

ELEMENT PROMOTION MANAGEMENT—a function which coordinates the progression of elements, communications, and their related data along a customer defined promotion path.

ELEMENT REVISION—a specific occurrence of an element resulting from the creation of a new element or a change to an existing element.

ELEMENT STORAGE MECHANISM—the method used to store an archive changes to an element. Within PVCS, each element ends in a #.

ELEMENT TRACKING—see TRACKING.

EXECUTABLE—the output of the generation of an element. Program load and exploded JCL are examples. Once in this form, an element is in its final, useable form.

EXTENSIBILITY—according to the American Heritage Dictionary it is the "capability of being extended, especially without breaking." Extensibility differs from flexibility in that it implies meeting requirements yet unknown. When something is extensible, it can be stretched and reshaped as needed.

FUNCTION (specifically, RMS Function)—(1) Any automated process or processes used to progress elements from one stage to the next in the application development life cycle that RMS is responsible for defining and maintaining. (2) At least one RMS process that is invoked to progress an element past a milestone in the application development life cycle. Examples include, but are not limited to, distribution, implementation, and deletion.

GENERATED ELEMENT—the output of a revision management generator. If a generation process is not applicable to an element, the source is the generated element.

GENERATION—any process applied to an element by a revision manager. This may be a compile for COBOL source, a standards enforcing tool for JCL, or an Autoflow interpreter.

GRAPHICAL USER INTERFACE (GUI)—an application dialog consisting of windows, menus, icons, pointers, and other graphics not available on a character-based terminal.

GROUPING—a set of elements logically related to one another based on some common attribute or set of attributes.

IMPACT ANALYSIS—a forecast of the effect a modification to one element will have on other related elements.

IMPLEMENTATION GROUP—one or more logically related elements, communications, or element profiles. Implementation groups provide a means to leverage and coordinate the revision management processes throughout development, promotion, distribution, and implementation. For example, an implementation group may consist of all of the elements that have been modified for a given project. Once defined, the implementation group name can be used to apply any revision management function to each of the elements defined in the implementation group.

IMPLEMENTATION GROUP VIEW—a customized view of all Implementation Groups that have been defined by all users of RMS based on criteria such as effective date or creator. Multiple views may be created and updated as needed.

IMPLEMENTATION MANAGEMENT—a process that manages the events that surround project installation. These events include processes that must be applied to elements after they have been distributed. Examples include the JCL change table process, the DB2 bind process, and the execution of one-time jobs. This process is also responsible for communicating implementation status of the element and/or package to the element inventory.

INVENTORY MANAGEMENT—a process that maintains all data pertaining to all elements in the development and production environments.

MERGE—a process that combines independently developed source changes.

METADATA—information about data. As it relates to the Revision Management System, it's information about an element. Examples include the element type, description, version, and custodian. Data maintained today in an Issuance Control Member (ICM) is metadata MODEL—a means to express all of the relationships within a system and to graphically illustrate the data, process, and logic within that system. A model is made of a surface, which is a picture or graphic that indicates how the parts of a business system fit together and the contents, which is the detail or description of each part shown on the surface.

NEXT GENERATION OF ISSUANCE (NGI) COMMITTEE—a group of Issuance Support representatives formed to study future distribution and implementation needs at State Farm. The committee's activities began in February of 1990 and were completed in December of 1992.

OBJECT—the output from a language compiler that may or may not be executable.

OBJECT-ORIENTED USER INTERFACE—an interactive dialog concept where the application's data and services are represented by icons which can directly interact with other icons. The other icons may or may not be a part of the same dialog. A example would be dropping a file icon on the shredder icon to have the file deleted.

OPERATIONS HORIZON—the imaginary line that divides the development and operations environments. It is the point in the promotion hierarchy where the developer no longer has direct and complete control over the movement and execution of his or her application; additional operating constraints are applied and operations personnel are involved in the package distribution and implementation.

PACKAGE—one or more logically related elements. Packages provide a means to leverage and coordinate the revision management processes throughout development, promotion, distribution, and implementation. For example, a package may consist of all of the elements that are to be or have been modified for a given project. Once defined, the package name can be used to apply any revision management function to each of the elements defined in the package. A package is a logical view of the element inventory; package contents are defined by a query of the inventory.

PLATFORM—an operating system. Examples include HP's MPE, IBM's MVS, VSE, Data General (DG), and OS/2.

POPULATION—the sending or resending of production elements to production processing sites (mainframes, work stations, tablets, etc.).

PROCESS (specifically, RMS Process)—Any particular automated service that performs a single logical action that RMS is responsible for maintaining access to. Examples include, but are not limited to, check-in, check-out, and executable generation.

PROCESS MODELER—a person responsible for creating and maintaining the project process model. It is important for the process modeler to understand process modeling concepts and to know how to use the BACHMAN/Analyst tool.

PROJECT MANAGER—the person responsible for the project. This person will need to understand Model Driven Development (MDD) concepts and how it works with SFPM.

PROJECT MODEL MANAGER—a person responsible for managing the model of the RMS project. This person will work with the overall RMS model manager to ensure all updates are merged with the RMS model.

PROMOTION—the coordinated movement of elements throughout the development life cycle.

PROMOTION GROUP—that part of the promotion hierarchy associated to a specific promotion library (or group of libraries if one library will not support multiple element types).

PROMOTION HIERARCHY—an overview of the logical course elements will take in the development cycle. It is made up of two or more tiers called promotion levels.

PROMOTION LEVEL—relates to different levels of testing. The bottom level, s where all source modification takes place, is always development and the top level is always production. The levels in between, if any, represent higher and higher levels of integration with existing production elements or other elements being developed concurrently.

PROMOTION PATH—the developer specified list of promotion levels a project will proceed through during the development process.

PVCS (Polytron Version Control System)—a vendor product that performs version control services for the LAN development environment.

PVCS ACCESS CONTROL DATABASE—a file that contains users, groups, and their Version Manager access privileges. The access control database lets you control who can use PVCS, what PVCS menu items a user can see, and which archive actions a user is allowed to perform.

PVCS ACCESS LIST—a list of users and groups, stored in an archive, that specifies who is authorized to perform operations on that archive.

PVCS CONFIGURATION FILE—a text file that controls how Version Manager operates.

PVCS CONFIGURATION OPTIONS—Reserved words that control Version Manager operation. For example, configuration operations let you control what the program does with workfiles after checking them in, where archives are stored, and whether archives are compressed.

REBUILD—the reconstruction of elements as they existed at a given point in time. This may or may not require the restoration or distribution of elements.

REGRESSION—the overlaying of one developer's changes to an element by another developer.

REPOSITORY—an information store. An application which centralizes all information about the business and the applications which support it (application and business metadata).

RESTORE—the reinstatement of an element revision and its metadata, if necessary, from the historical element inventory to the current element inventory.

REVERT—the removal of a production revision of an element in lieu of a selected previous revision.

REVISION MANAGEMENT SYSTEM—a set of services that track and control change to elements as well as maintain the relationship integrity between element source and objects created from that source.

REVISION NUMBER—one or more pairs of numbers used to denote the version or release of an element. The numbers in each pair are separated by a period (.). The first number is known as the version and the second is called the revision (a typical element revision might look like 1.4 or 1.16). The version number is incremented to denote parallel branch development while the revision is incremented each time an element revision is checked in to the RMS.

RMS—see REVISION MANAGEMENT SYSTEM.

RMS MODEL MANAGER—a person responsible for the distribution and merging of the model with the RMS projects. This person will work with each project model manager to keep the RMS model up-to-date.

RMS PROMOTION GROUPS—permanent promotion groups that only RMS services can update.

RMS PROMOTION LEVELS—permanent promotion levels that only RMS services can update.

SCRIPT—a collection of standardized instructions used to communicate to the Revision Management System. Generally, these instructions indicate what should be done and the order the events should take place.

TIP—the revision that refers to the highest numerical revision of the trunk or branch. For example, if an element has four trunk revisions they would be: 1.0, 1.1, 1.2, and 1.3. The tip of the trunk would be 1.3.

TRACKING—a process that can trace individual element revisions throughout development.

TRANSACTION MODELER—a person responsible for writing detailed CRUD (Create/Read/Update/Delete) transactions for the project data model. It is important for the transaction modeler to understand the data and process model concepts, along with understanding how to use the BACHMAN/Analyst tool to create PSD (Process Specification Diagrams).

TRUNK—the series of single pair revision numbers (such as 1.0, 1.1, 1.2, . . . , 1.7) of any element The trunk has special significance to the RMS because trunk revisions are considered production. However, only the topmost trunk revision is considered current production. In the preceding example, trunk revision 1.7 is the topmost revision.

USER DEFINED PROMOTION GROUPS—promotion groups created by the RMS as the project promotion hierarchy dictates. The user has full read/write authority over the associated libraries.

WORK FORCE SEGMENT—the concept of a logical organization of human resources.

What is claimed is:

1. A revision management system, comprising:
   an inventory group manager (IGM) configured for generating and managing one or more lists for each of one or more elements logically related to each other as one or more inventory groups, said inventory group manager configured for maintaining and managing the lists of the elements in the inventory group and providing new elements to be added to the inventory group;
   a work group manager (WGM) configured for selecting the elements relating to a project that require modification, the elements requiring the modifications for the project comprising a work group, wherein the work group includes a logical collection of the elements requiring the modifications for the project, and facilitates the elements within a same work group to be changed at least one of together, substantially simultaneously, and substantially concurrently, said WGM configured for selecting the elements from the inventory groups to form a project work group; and
   a version manager (VM) configured for tracking the modifications to the elements in the project work group, configured for managing the modifications to the elements in the project work group, and configured for generating reports with respect to the modifications responsive to user selectable criteria.

2. A revision management system according to claim 1, wherein said IGM is configured for managing modules and documentation for an application in a first inventory group, and said IGM configured for managing utility modules for the application in a second inventory group.

3. A revision management system according to claim 1, wherein said IGM is configured for managing the element in more than one inventory group to facilitate retrieval and management of the element.

4. A revision management system according to claim 1, wherein said IGM is configured for managing the inventory groups, each having a unique inventory group name.

5. A revision management system according to claim 1, wherein said IGM is configured for grouping the elements in accordance with user selectable criteria.

6. A revision management system according to claim 1, wherein said IGM is configured for grouping the elements and all references to each of the elements point to a same physical file.

7. A revision management system according to claim 1, wherein said WGM is configured for assigning the elements that require modification to the work group, and the elements optionally belonging to different inventory groups.

8. A revision management system according to claim 1, wherein said WGM is configured for assigning the elements that require modification to the work group, and the work group including some of the elements in the inventory group.

9. A revision management system according to claim 1, wherein a project manager creates the work group using said WGM, and the work group being accessible to a plurality of analysts.

10. A revision management system according to claim 1, wherein said WGM is configured for assigning the elements that require modification from one or more of a plurality of inventory groups.

11. A revision management system according to claim 1, wherein said WGM is configured for assigning some of the elements of the inventory group that require modification.

12. A revision management system according to claim 1, wherein said WGM is configured for managing the each of the project work groups, each having a unique project work group name.

13. A revision management system according to claim 1, wherein said VM is configured for providing the following functions related to tracking and managing the modifications to the elements in the project work group:
   (a) managing concurrent development changes to a single element,
   (b) checking out a copy of an existing element,
   (c) checking in a revised copy of a revised element including the modifications associated therewith,
   (d) merging changes in two revisions, and
   (e) reporting differences between two revisions or work files.

14. A revision management system according to claim 13, wherein said checking out function (b) comprises retrieving a copy of the element for making modifications thereto.

15. A revision management system according to claim 13, wherein said checking out function (b) comprises selecting a project revision from an expanded tree displaying a plurality of project revisions, and selecting the element from the list.

16. A revision management system according to claim 13,
   wherein said IGM is configured for assigning an initial revision number to the element when the element is first entered into the revision management system,
   wherein when the element is put into production a trunk is formed defining a development path for the element, and when the element is put into subsequent production a branch is formed defining a separate development path for the element from the development path defined by the trunk, and wherein said checking out function (b) comprises checking out another element from another project, and said VM generating a new branch identifying the another project.

17. A revision management system according to claim 16, wherein the new branch includes a version label used to identify the another project.

18. A revision management system according to claim 13, wherein said IGM is configured for assigning an initial revision number to the element when the element is first entered into the revision management system, wherein when the element is put into production a trunk is formed defining a development path for the element, and when the element is put into subsequent production a branch is formed defining a separate development path for the element from the development path defined by the trunk, and the branch including a version label used to identify the project and a tip identifying the most recent revision in the branch, and wherein said checking out function (b) comprises selecting the revision number or the version label from which to check out the element, and selecting a work file.

19. A revision management system according to claim 18, wherein the work file comprises at least one of a read only file, a writable with lock file and a writable file.

20. A revision management system according to claim 19, wherein the read only file is not updatable, cannot be checked back into the revision management system, and no changes to the revision management system are performed when the read only file of the element is checked out.

21. A revision management system according to claim 19, wherein the writable with lock file of the element is stored in a project working directory associated with the project work group, and the revision management system is updated including a location of the revision, a work group name, a project date, and a logon identifier when the element is subsequently checked in.

22. A revision management system according to claim 19, wherein the writable file is modifiable using an editor without being managed, tracked and updated in the revision management system.

23. A revision management system according to claim 13, wherein said IGM is configured for assigning an initial revision number to the element when the element is first entered into the revision management system, wherein when the element is put into production a trunk is formed defining a development path for the element, and when the element is put into subsequent production a branch is formed defining a separate development path for the element from the development path defined by the trunk, and the branch including a version label used to identify the project and a tip identifying the most recent revision in the branch, wherein when the branch does not already exist for a current work group, said checking out function (b) comprises selecting the revision number or the version label from which to check out the element, and said VM generating a new branch identifying the project, and wherein when the branch already exists for the current work group, said checking out function (b) comprises selecting another revision number or another version label from which to check out the element, and said VM generating a new tip of the branch identifying the project.

24. A revision management system according to claim 13, wherein said checking in function (c) further comprises the function of recording history of incremental modifications to the element.

25. A revision management system according to claim 13, wherein during said checking in function (c), the revision management system copies the modifications to the element from the working directory to an archive, releases a lock on the element, updates archive information in the archive, and cleans up the working directory.

26. A revision management system according to claim 1, wherein said IGM is configured for assigning an initial revision number to the element when the element is first entered into the revision management system, and the first revision element being a copy of each instance of the element.

27. A revision management system according to claim 26, wherein said IGM is configured for assigning a new revision number to the element when the element is modified and put into production.

28. A revision management system according to claim 27, wherein when the element is put into production a trunk is formed for the revision defining a development path for the element, the trunk being the development path stemming from the element as first entered in the revision management system.

29. A revision management system according to claim 28, wherein when the element is put into subsequent production a branch is formed for the revision defining a separate development path for the element from the development path defined by the trunk, the branch being the separate development path including one or more revisions that diverge from the trunk, the branch beginning from the revision defined by the trunk.

30. A revision management system according to claim 29, wherein a parallel branch of development is initiatable from the subsequent revision contained within the branch, providing the capability of alternate revisions of the same element for different projects.

31. A revision management system according to claim 29, wherein a most recent revision in the branch is defined as a tip.

32. The revision management system according to claim 1, wherein the elements are selected from the inventory groups to form the project work group, and the modifications are tracked to the elements in the project work group.

33. The revision management system according to claim 1, wherein the elements are grouped in accordance with a common inventory group.

34. The revision management system according to claim 1, wherein a software version or release comprises a plurality of projects, and the project comprises a plurality of work groups, and a work group comprises a plurality of elements.

35. The revision management system according to claim 1, wherein the elements assigned to the work group do not have to be in the same inventory group, the work groups do not have to contain all the elements of the inventory group, and a project manager creates the work group, and multiple analysts access the work group.

36. The revision management system according to claim 1, wherein when a branch does not exist for a current work group, a new branch is created and all modifications are stored in the branch, and when the branch exists, then a tip of the branch is checked out and locked.

37. A method of managing revisions to elements, comprising the steps of:
  (a) generating and managing one or more lists for each of one or more elements logically related to each other as one or more inventory groups;
  (b) maintaining and managing the lists of the elements in the inventory group;
  (c) providing new elements to be added to the inventory group;
  (d) selecting the elements relating to a project that require modification, the elements requiring the modifications for the project comprising a work group, wherein the work group includes a logical collection of the elements requiring the modifications for the project, and facilitates the elements within a same work group to be changed at least one of together, substantially simultaneously, and substantially concurrently;
  (e) selecting the elements from the inventory groups to form a project work group;
  (f) tracking the modifications to the elements in the project work group;
  (g) managing the modifications to the elements in the project work group; and
  (h) generating reports with respect to the modifications responsive to user selectable criteria.

38. The method according to claim 37, wherein the elements are selected from the inventory groups to form the project work group, and the modifications are tracked to the elements in the project work group.

39. The method according to claim 37, wherein the elements are grouped in accordance with a common inventory group.

40. The method according to claim 37, wherein a software version or release comprises a plurality of projects, and the project comprises a plurality of work groups, and a work group comprises a plurality of elements.

41. The method according to claim 37, wherein the elements assigned to the work group do not have to be in the same inventory group, the work groups do not have to contain all the elements of the inventory group, and a project manager creates the work group, and multiple analysts access the work group.

42. The method according to claim 37, wherein when a branch does not exist for a current work group, a new branch is created and all modifications are stored in the branch, and when the branch exists, then a tip of the branch is checked out and locked.

43. In a revision management system, a method of managing revisions to elements using an interactive work flow with a user, comprising the steps of:
  (a) receiving a request to change an element for a project;
  (b) locating, by the user, the element associated with the request for the project;
  (c) generating, by the user, a project work group identifying the project;
  (d) entering, by the user, the element associated with the request to the project work group, wherein the work group includes a logical collection of the elements requiring the changes for the project, and facilitates the elements within a same work group to be changed at least one of together, substantially simultaneously, and substantially concurrently;
  (e) obtaining, by the user, a working copy of the element associated with the request via a check out procedure;
  (f) entering, by the user, the change to the element using development tools;
  (g) entering the change into the revision management system for archiving; and
  (h) at least one of uploading host application element revisions to a host for issuance to production, and issuing work station application elements revisions directly to production.

44. The method according to claim 43, wherein the elements are selected from the inventory groups to form the project work group, and the modifications are tracked to the elements in the project work group.

45. The method according to claim 43, wherein the elements are grouped in accordance with a common inventory group.

46. The method according to claim 43, wherein a software version or release comprises a plurality of projects, and the project comprises a plurality of work groups, and a work group comprises a plurality of elements.

47. The method according to claim 43, wherein the elements assigned to the work group do not have to be in the same inventory group, the work groups do not have to contain all the elements of the inventory group, and a project manager creates the work group, and multiple analysts access the work group.

48. The method according to claim 43, wherein when a branch does not exist for a current work group, a new branch is created and all modifications are stored in the branch, and when the branch exists, then a tip of the branch is checked out and locked.

49. The revision management system, comprising:
  an inventory group manager (IGM) configured for generating and managing one or more lists for each of one or more elements logically related to each other as one or more inventory groups, said inventory group manager configured for maintaining and managing the lists of the elements in the inventory group and providing new elements to be added to the inventory group;
  a work group manager (WGM) configured for selecting the elements relating to a project that require modification, the elements requiring the modifications for the project comprising a work group, said WGM configured for selecting the elements from the inventory groups to form a project work group; and
  a version manager (VM) configured for tracking the modifications to the elements in the project work group, configured for managing the modifications to the elements in the project work group, and configured for generating reports with respect to the modifications responsive to user selectable criteria, wherein said VM is configured for providing the following functions related to tracking and managing the modifications to the elements in the project work group:
  (a) managing concurrent development changes to a single element,
  (b) checking out a copy of an existing element,
  (c) checking in a revised copy of a revised element including the modifications associated therewith,
  (d) merging changes in two revisions, and
  (e) reporting differences between two revisions or work files.

50. The revision management system according to claim 49, wherein said checking out function (b) comprises retrieving a copy of the element for making modifications thereto.

51. A revision management system according to claim 49, wherein said checking out function (b) comprises selecting a project revision from an expanded tree displaying a plurality of project revisions, and selecting the element from the list.

52. The revision management system according to claim 49,
   wherein said IGM is configured for assigning an initial revision number to the element when the element is first entered into the revision management system,
   wherein when the element is put into production a trunk is formed defining a development path for the element, and when the element is put into subsequent production a branch is formed defining a separate development path for the element from the development path defined by the trunk, and
   wherein said checking out function (b) comprises checking out another element from another project, and said VM generating a new branch identifying the another project.

53. The revision management system according to claim 52, wherein the new branch includes a version label used to identify the another project.

54. The revision management system according to claim 49,
   wherein said IGM is configured for assigning an initial revision number to the element when the element is first entered into the revision management system,
   wherein when the element is put into production a trunk is formed defining a development path for the element, and when the element is put into subsequent production a branch is formed defining a separate development path for the element from the development path defined by the trunk, and the branch including a version label used to identify the project and a tip identifying the most recent revision in the branch, and
   wherein said checking out function (b) comprises selecting the revision number or the version label from which to check out the element, and selecting a work file.

55. The revision management system according to claim 54, wherein the work file comprises at least one of a read only file, a writable with lock file and a writable file.

56. The revision management system according to claim 55, wherein the read only file is not updatable, cannot be checked back into the revision management system, and no changes to the revision management system are performed when the read only file of the element is checked out.

57. The revision management system according to claim 55, wherein the writable with lock file of the element is stored in a project working directory associated with the project work group, and the revision management system is updated including a location of the revision, a work group name, a project date, and a logon identifier when the element is subsequently checked in.

58. The revision management system according to claim 55, wherein the writable file is modifiable using an editor without being managed, tracked and updated in the revision management system.

59. The revision management system according to claim 49,
   wherein said IGM is configured for assigning an initial revision number to the element when the element is first entered into the revision management system,
   wherein when the element is put into production a trunk is formed defining a development path for the element, and when the element is put into subsequent production a branch is formed defining a separate development path for the element from the development path defined by the trunk, and the branch including a version label used to identify the project and a tip identifying the most recent revision in the branch,
   wherein when the branch does not already exist for a current work group, said checking out function (b) comprises selecting the revision number or the version label from which to check out the element, and said VM generating a new branch identifying the project, and
   wherein when the branch already exists for the current work group, said checking out function (b) comprises selecting another revision number or another version label from which to check out the element, and said VM generating a new tip of the branch identifying the project.

60. The revision management system according to claim 49, wherein said checking in function (c) further comprises the function of recording history of incremental modifications to the element.

61. The revision management system according to claim 49, wherein during said checking in function (c), the revision management system copies the modifications to the element from the working directory to an archive, releases a lock on the element, updates archive information in the archive, and cleans up the working directory.

62. The revision management system, comprising:
   an inventory group manager (IGM) configured for generating and managing one or more lists for each of one or more elements logically related to each other as one or more inventory groups, said inventory group manager configured for maintaining and managing the lists of the elements in the inventory group and providing new elements to be added to the inventory group, wherein said IGM is configured for assigning an initial revision number to the element when the element is first entered into the revision management system, the first revision element being a copy of each instance of the element, wherein said IGM is further configured for assigning a new revision number to the element when the element is modified and put into production, and wherein when the element is put into production a trunk is formed for the revision defining a development path for the element, the trunk being the development path stemming from the element as first entered in the revision management system;
   a work group manager (WGM) configured for selecting the elements relating to a project that require modification, the elements requiring the modifications for the project comprising a work group, said WGM configured for selecting the elements from the inventory groups to form a project work group; and
   a version manager (VM) configured for tracking the modifications to the elements in the project work group, configured for managing the modifications to the elements in the project work group, and configured for generating reports with respect to the modifications responsive to user selectable criteria.

63. The revision management system according to claim 62, wherein when the element is put into subsequent production a branch is formed for the revision defining a separate development path for the element from the development path defined by the trunk, the branch being the separate development path including one or more revisions that diverge from the trunk, the branch beginning from the revision defined by the trunk.

64. The revision management system according to claim 63, wherein a parallel branch of development is initiatable from the subsequent revision contained within the branch, providing the capability of alternate revisions of the same element for different projects.

65. The revision management system according to claim 63, wherein a most recent revision in the branch is defined as a tip.

* * * * *